United States Patent
Galley et al.

(10) Patent No.: US 12,509,467 B2
(45) Date of Patent: Dec. 30, 2025

(54) CGAS INHIBITING TRIAZOLOPYRIMIDONE DERIVATIVES

(71) Applicant: Hoffmann-La Roche Inc., Little Falls, NJ (US)

(72) Inventors: Guido Galley, Rheinfelden (DE); Katrin Groebke Zbinden, Liestal (CH); Wolfgang Guba, Müllheim (DE); Daniel Hunziker, Möhlin (CH)

(73) Assignee: Hoffmann-La Roche Inc., Little Falls, NJ (US)

( * ) Notice: Subject to any disclaimer, the term of this patent is extended or adjusted under 35 U.S.C. 154(b) by 548 days.

(21) Appl. No.: 17/999,194

(22) PCT Filed: May 18, 2021

(86) PCT No.: PCT/EP2021/063039
§ 371 (c)(1),
(2) Date: Nov. 17, 2022

(87) PCT Pub. No.: WO2021/233852
PCT Pub. Date: Nov. 25, 2021

(65) Prior Publication Data
US 2023/0374014 A1    Nov. 23, 2023

(30) Foreign Application Priority Data
May 20, 2020  (EP) .................................. 20175643

(51) Int. Cl.
*C07D 487/04*   (2006.01)
*A61P 29/00*    (2006.01)

(52) U.S. Cl.
CPC .................................. *C07D 487/04* (2013.01)

(58) Field of Classification Search
CPC ............................... C07D 487/04; A61P 29/00
See application file for complete search history.

(56) References Cited

FOREIGN PATENT DOCUMENTS

| WO | 2005/054246 A2 | 6/2005 |
|----|----------------|--------|
| WO | 2019/055750 A1 | 3/2019 |

OTHER PUBLICATIONS

"International Preliminary Report on Patentability—PCT/EP2021/063039" (Report Issuance Date: Nov. 17, 2022; Chapter I),:pp. 1-8 (Dec. 1, 2022).
"International Search Report—PCT/EP2021/063039" (w/Written Opinion),:pp. 1-12 (Jul. 29, 2021).

*Primary Examiner* — Ernst V Arnold
(74) *Attorney, Agent, or Firm* — Robert C. Hall

(57) ABSTRACT

The invention relates to a compound of formula (I), wherein $R^1$-$R^3$ and $A^1$-$A^3$ are as defined in the description and in the claims. The compound of formula (I) can be used as a medicament.

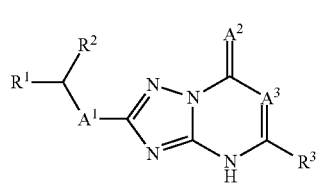

(I)

14 Claims, No Drawings

CGAS INHIBITING TRIAZOLOPYRIMIDONE DERIVATIVES

CROSS-REFERENCE TO RELATED APPLICATIONS

This application is the National Stage Entry under 35 U.S.C. § 371 of International Application No. PCT/EP2021/063039, filed May 18, 2021, which claims benefit of priority under 35 U.S.C. § 119 (a) to EP application Ser. No. 20175643.4 filed on May 20, 2020, each of which is incorporated herein by reference in its entirety.

The present invention relates to organic compounds useful for therapy and/or prophylaxis in a mammal, and in particular to compounds that modulate cGAS activity.

The invention relates in particular to a compound of formula (I)

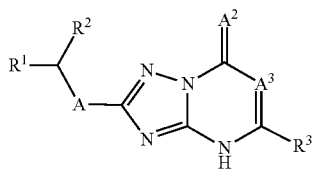

wherein
$R^1$ is alkylpiperazinyl(halopyridinyl), morpholino(halopyridinyl), morpholino(halopyrimidinyl), 2-oxa-6-azaspiro[3.3]heptanyl(halopyridinyl), pyrimidinyl(halophenyl), alkylpyrazolyl(halophenyl), ortho-para-dichlorophenyl, ortho-fluoro-para-chlorophenyl, cycloalkylisoxazolyl, phenylpyrazolyl, phenylisoxazolyl, pyrazinylpyrazolyl, alkylpiperazinyl(halopyridinyl), phenyl(alkylpyrazolyl), piperidyl(halopyridinyl), alkylimidazolyl(halophenyl), morpholinophenyl, morpholino(halophenyl), morpholino(halopyridinyl), alkoxyazetidinyl(halopyridinyl), halobiphenyl, pyridinyl(halophenyl), isoxazolylcarbonylamino(halopyridinyl), alkylpyrazolyl(cyanophenyl), pyridazinyl(halophenyl), biphenyl, thiazolylamino(halophenyl), alkylpyrazolyl(alkoxyphenyl), alkylpyrazolyl(alkylphenyl), alkylpyrazolyl(pyridinyl), alkylpyrazolyl (haloalkylphenyl), quinolyl, biphenyl, alkylpyrazolylphenyl, phenyl alkyloxy(halophenyl), alkoxy(halophenyl), cycloalkyloxyphenyl, imidazolylphenyl, haloalkyloxyphenyl, cyano(halophenyl), pyrazolylphenyl, benzoxazol, iso-propylphenyl, alkoxy(alkylphenyl), pyrimidinylphenyl, halo(alkylphenyl) or (para-ethyloxy)phenyl;
$R^2$ is hydrogen or methyl;
$R^3$ is alkyl, cycloalkyl, alkoxyalkyl, difluoroalkyl, trifluoroalkyl, phenylalkyl, phenylaminoalkyl or cycloalkylalkyl;
$A^1$ is —NH— or oxygen;
$A^2$ is oxygen or sulfur; and
$A^3$ is —CH— or nitrogen;
or a pharmaceutically acceptable salt or tautomer thereof; provided that
[1,2,4]Triazolo[1,5-a]pyrimidin-7(1H)-one, 2-[[(2,4-dichlorophenyl)methyl]amino]-5-propyl;
[1,2,4]Triazolo[1,5-a]pyrimidin-7(1H)-one, 5-ethyl-2-[[[4-(1-methylethyl)phenyl]methyl]amino];
[1,2,4]Triazolo[1,5-a]pyrimidin-7(1H)-one, 2-[[(2,4-dichlorophenyl)methyl]amino]-5-methyl;
[1,2,4]Triazolo[1,5-a]pyrimidin-7(1H)-one, 2-[[(4-ethoxyphenyl)methyl]amino]-5-(1-methylethyl);
[1,2,4]Triazolo[1,5-a]pyrimidin-7(1H)-one, 2-[[[4-(1-methylethyl)phenyl]methyl]amino]-5-[(phenylamino)methyl];
[1,2,4]Triazolo[1,5-a]pyrimidin-7(1H)-one, 2-[[[4-(1-methylethyl)phenyl]methyl]amino]-5-propyl;
[1,2,4]Triazolo[1,5-a]pyrimidin-7(1H)-one, 2-[[(4-ethoxyphenyl)methyl]amino]-5-[(phenylamino)methyl];
[1,2,4]Triazolo[1,5-a]pyrimidin-7(1H)-one, 5-methyl-2-[[[4-(1-methylethyl)phenyl]methyl]amino];
[1,2,4]Triazolo[1,5-a]pyrimidin-7(1H)-one, 2-[[(4-ethoxyphenyl)methyl]amino]-5-methyl;
[1,2,4]Triazolo[1,5-a]pyrimidin-7(1H)-one, 2-[[(4-ethoxyphenyl)methyl]amino]-5-propyl; and
[1,2,4]Triazolo[1,5-a]pyrimidin-7(1H)-one, 2-[[(4-ethoxyphenyl)methyl]amino]-5-ethyl;
are excluded.

Cytokines are responsible for modulation of the innate immune response and the dysregulation of pro-inflammatory cytokines has been associated with severe systemic inflammation and autoimmune diseases, many of which lack efficient therapy as of today.

Vertebrates possess an innate and adaptive immune system as protection against pathogens and other challenges. The innate immune system is an evolutionary old system that is present beyond vertebrates. Unlike the adaptive immune system, it does not require priming or training, but works as a general physical barrier (e.g. skin) or by detection of specific patterns. One universal pattern to trigger the innate immune system is the detection of cytosolic double stranded DNA, which leads to Type I Interferon response. Sources of cytosolic dsDNA could be from bacterial or viral infection but as well accumulated self-DNA.

The cytosolic enzyme cyclic GMP-AMP Synthase (cGAS) is a sensor for cytosolic double stranded DNA. Binding of dsDNA results in the generation of the cyclic di-nucleotide 2,3-cGAMP by enzymatic linkage of ATP and GTP. 2,3-cGAMP acts as secondary messenger and binds to the Stimulator of Interferon Genes (STING), which resides in the endoplasmatic reticulum. Upon binding of 2,3-cGAMP, STING translocates to the perinuclear Golgi, where it associates with the TANK binding kinase 1 (TBK1) and recruits and phosphorylates Interferon Response Factor 3 (IRF3). Ultimately this results in the production Type I Interferon (I IFN), other cytokines like IL-6, TNFα, IL1β and chemokines—essential factors for host defense against invading pathogens. However, inappropriate or chronic production of type I IFN and other pro-inflammatory cytokines are associated with severe systemic inflammation and autoimmune diseases. For instance, IFN signaling is involved in SLE, cutaneous skin diseases (dermatomyositis, and cutaneous lupus), interstitial pulmonary fibrosis, Sjogren syndrome, and type I diabetes (G. Trinchieri, J Exp Med. 2010 207(10): 2053-63). Other pro-inflammatory cytokine such as TNFα and IL1β play an important role in inflammatory bowel disease, NASH, juvenile inflammatory arthritis, ankylosing spondylitis and gout.

Chronic activation of cGAS/STING causes severe systemic inflammation. Evidence for its role in inflammation in the clinic comes from monogenic diseases. Patients with deficiencies in nucleic acid modifying enzymes, like Trex1, RNaseH2 and SAMHD1, suffer from Aicardi-Goutieres syndrome (AGS). The involvement of cGAS/STING was supported in Trex1 deficient mice that serve as a model for AGS.

Inhibition of the cGAS pathway which is upstream from the disease mediating cytokines is therefore a novel strategy in treating patients from multiple autoimmune diseases. Indications could include those linked to IFN signaling or those driven by TNFα and IL1β.

As of today many diseases caused by dysregulation of the innate immune system lack efficient therapies.

The compound of the invention binds to cGAS and modulates its activity.

The compound of formula (I) is particularly useful in the treatment or prophylaxis of e.g. systemic lupus erythrematosus (SLE), cutaneous skin diseases like dermatomyositis or cutaneous lupus, interstitial pulmonary fibrosis, Sjogren syndrome, type I diabetes, inflammatory bowel disease, non-alcoholic steatohepatitis (NASH), juvenile inflammatory arthritis, ankylosing spondylitis, gout or Aicardi-Goutieres syndrome (AGS).

In the present description the term "alkyl", alone or in combination, signifies a straight-chain or branched-chain alkyl group with 1 to 8 carbon atoms, particularly a straight or branched-chain alkyl group with 1 to 6 carbon atoms and more particularly a straight or branched-chain alkyl group with 1 to 4 carbon atoms. Examples of straight-chain and branched-chain C1-C8 alkyl groups are methyl, ethyl, propyl, isopropyl, butyl, isobutyl, tert.-butyl, the isomeric pentyls, the isomeric hexyls, the isomeric heptyls and the isomeric octyls, particularly methyl, ethyl, propyl, butyl and pentyl. Particular examples of alkyl are methyl, ethyl, propyl, isopropyl, butyl and isobutyl. Methyl, ethyl, propyl and butyl, like isobutyl, are further particular examples of "alkyl" in the compound of formula (I).

The term "cycloalkyl", alone or in combination, signifies a cycloalkyl ring with 3 to 8 carbon atoms and particularly a cycloalkyl ring with 3 to 6 carbon atoms. Examples of cycloalkyl are cyclopropyl, cyclobutyl, cyclopentyl, cyclohexyl, cycloheptyl and cyclooctyl. Particular examples of "cycloalkyl" are cyclopropyl and cyclobutyl.

The term "alkoxy" or "alkyloxy", alone or in combination, signifies a group of the formula alkyl-O— in which the term "alkyl" has the previously given significance, such as methoxy, ethoxy, n-propoxy, isopropoxy, n-butoxy, isobutoxy, sec-butoxy and tert.-butoxy. Particular examples of "alkoxy" are methoxy and ethoxy.

The term "oxy", alone or in combination, signifies the —O— group.

The term "oxo", alone or in combination, signifies the =O group.

The terms "halogen" or "halo", alone or in combination, signifies fluorine, chlorine, bromine or iodine and particularly fluorine, chlorine or bromine, more particularly fluorine. The term "halo", in combination with another group, denotes the substitution of said group with at least one halogen, particularly substituted with one to five halogens, particularly one to four halogens, i.e. one, two, three or four halogens.

The term "haloalkyl", alone or in combination, denotes an alkyl group substituted with at least one halogen, particularly substituted with one to five halogens, particularly one to three halogens, more particularly three halogens. Particular "haloalkyl" are fluoromethyl, fluoroethyl, fluoropropyl and fluorobutyl.

The term "haloalkoxy", alone or in combination, denotes an alkoxy group substituted with at least one halogen, particularly substituted with one to five halogens, particularly one to three halogens. Particular "haloalkoxy" are fluoromethoxy, fluoroethoxy and fluoropropyloxy.

The terms "hydroxyl" and "hydroxy", alone or in combination, signify the —OH group.

The term "carbonyl", alone or in combination, signifies the —C(O)— group.

The term "amino", alone or in combination, signifies the primary amino group (—NH$_2$), the secondary amino group (—NH—), or the tertiary amino group (—N—).

The term "alkylamino" is alkyl group linked to a —NH— group. The term "dialkylamino" denotes two alkyl groups linked to a —N— atom.

The term "sulfonyl", alone or in combination, signifies the —SO$_2$— group.

The term "pharmaceutically acceptable salts" refers to those salts which retain the biological effectiveness and properties of the free bases or free acids, which are not biologically or otherwise undesirable. The salts are formed with inorganic acids such as hydrochloric acid, hydrobromic acid, sulfuric acid, nitric acid, phosphoric acid, particularly hydrochloric acid, and organic acids such as acetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, N-acetylcystein. In addition these salts may be prepared from addition of an inorganic base or an organic base to the free acid. Salts derived from an inorganic base include, but are not limited to, the sodium, potassium, lithium, ammonium, calcium, magnesium salts. Salts derived from organic bases include, but are not limited to salts of primary, secondary, and tertiary amines, substituted amines including naturally occurring substituted amines, cyclic amines and basic ion exchange resins, such as isopropylamine, trimethylamine, diethylamine, triethylamine, tripropylamine, ethanolamine, lysine, arginine, N-ethylpiperidine, piperidine, polyamine resins. The compound of formula (I) can also be present in the form of zwitterions. Particularly preferred pharmaceutically acceptable salts of compounds of formula (I) are the salts of trifluoroacetic acid, hydrochloric acid, hydrobromic acid, sulfuric acid, phosphoric acid and methanesulfonic acid.

The compound of formula (I) can exist as a tautomer (I'), i.e. a structural isomer which interconverts with the the compound of formula (I), in particular in solution.

The tautomeric equilibrium of the compound of formula (I) with its tautomeric form (I') can be represented as follows:

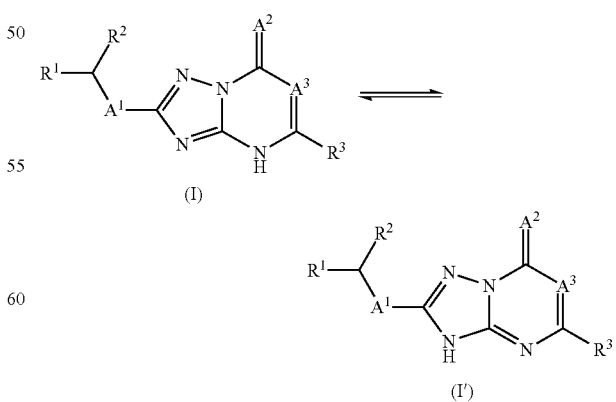

If one of the starting materials or compounds of formula (I) contain one or more functional groups which are not stable or are reactive under the reaction conditions of one or more reaction steps, appropriate protecting groups (as described e.g. in "Protective Groups in Organic Chemistry" by T. W. Greene and P. G. M. Wuts, 3$^{rd}$ Ed., 1999, Wiley, New York) can be introduced before the critical step applying methods well known in the art. Such protecting groups can be removed at a later stage of the synthesis using standard methods described in the literature. Examples of protecting groups are tert-butoxycarbonyl (Boc), 9-fluorenylmethyl carbamate (Fmoc), 2-trimethylsilylethyl carbamate (Teoc), carbobenzyloxy (Cbz) and p-methoxybenzyloxycarbonyl (Moz).

The compound of formula (I) can contain several asymmetric centers and can be present in the form of optically pure enantiomers, mixtures of enantiomers such as, for example, racemates, mixtures of diastereoisomers, diastereoisomeric racemates or mixtures of diastereoisomeric racemates.

The term "asymmetric carbon atom" means a carbon atom with four different substituents. According to the Cahn-Ingold-Prelog Convention an asymmetric carbon atom can be of the "R" or "S" configuration.

The invention thus relates to:

A compound according to the invention wherein $R^1$ is methylpiperazinyl(chloropyridinyl), morpholino(chloropyridinyl), morpholino(chloropyrimidinyl), 2-oxa-6-azaspiro[3.3]heptanyl(chloropyridinyl), methylpyrazolyl(chlorophenyl), ortho-para-dichlorophenyl, ortho-fluoro-para-chlorophenyl, cyclopropylisoxazolyl, phenylpyrazolyl, phenylisoxazolyl, pyrazinylpyrazolyl, methylpiperazinyl(chloropyridinyl), phenyl(methylpyrazolyl), pyrimidinyl(chorophenyl), piperidyl(chloropyridinyl), methylimidazolyl(chlorophenyl), morpholinophenyl, morpholino(chlorophenyl), morpholino(chloropyridinyl), methoxyazetidinyl(chloropyridinyl), fluorobiphenyl, chlorobiphenyl, pyridinyl(halophenyl), isoxazolylcarbonylamino(chloropyridinyl), methylpyrazolyl(cyanophenyl), pyridazinyl(chlorophenyl), biphenyl, thiazolylamino(chlorophenyl), methylpyrazolyl(methoxyphenyl), methylpyrazolyl(methylphenyl), methylpyrazolyl(pyridinyl), methylpyrazolyl(trifluoromethylphenyl), quinolyl, methylpyrazolylphenyl, phenylmethoxy(chlorophenyl), methoxy(chlorophenyl), methoxy(fluorophenyl), ethoxy(chlorophenyl), cyclopropyloxyphenyl, imidazolylphenyl, trifluoroethoxyphenyl, cyano(chlorophenyl), pyrazolylphenyl, benzoxazol, isopropylphenyl, methoxy(methylphenyl), pyrimidinylphenyl, chloro(methylphenyl) or (para-ethyloxy) phenyl;

A compound according to the invention wherein $R^1$ is 2-oxa-6-azaspiro[3.3]heptanyl(halopyridinyl), pyrimidinyl(halophenyl), alkylpyrazolyl(halophenyl) or pyridinyl(halophenyl);

A compound according to the invention wherein $R^1$ is 2-oxa-6-azaspiro[3.3]heptanyl(chloropyridinyl), pyrimidinyl(chlorophenyl), methylpyrazolyl(chlorophenyl) or pyridinyl(chlorophenyl);

A compound according to the invention wherein $R^2$ is hydrogen;

A compound according to the invention wherein $R^3$ is methyl, ethyl, propyl, isopropyl, butyl, isobutyl, cyclopropyl, methoxypropyl, methoxyethyl, difluorobutyl, trifluoromethyl, trifluoroethyl, phenylmethyl, phenylethyl, phenylaminomethyl, cyclopropylmethyl or cyclobutylmethyl;

A compound according to the invention wherein $R^3$ is alkyl, difluoroalkyl or phenylalkyl;

A compound according to the invention wherein $R^3$ is butyl, difluorobutyl or phenylmethyl;

A compound according to the invention wherein $A^1$ is —NH—;

A compound according to the invention wherein $A^2$ is oxygen;

A compound according to the invention wherein $A^3$ is —CH—.

The invention further relates to a compound selected from

2-[[4-chloro-6-(4-methylpiperazin-1-yl)-3-pyridyl]methylamino]-5-propyl-4H-[1,2,4]triazolo[1,5-a]pyrimidin-7-one;

2-[(4-chloro-6-morpholino-3-pyridyl)methylamino]-5-propyl-4H-[1,2,4]triazolo[1,5-a]pyrimidin-7-one;

5-butyl-2-[(5-chloro-2-morpholino-pyrimidin-4-yl)methylamino]-4H--[1,2,4]triazolo[1,5-a]pyrimidin-7-one;

5-butyl-2-[[5-chloro-2-(2-oxa-6-azaspiro[3.3]heptan-6-yl)-4-pyridyl]methylamino]-4H-[1,2,4]triazolo[1,5-a]pyrimidin-7-one;

5-butyl-2-[(2-chloro-5-pyrimidin-4-yl-phenyl)methylamino]-4H-[1,2,4]triazolo[1,5-a]pyrimidin-7-one;

2-[[2-chloro-5-(1-methylpyrazol-3-yl)phenyl]methylamino]-5-(2-methoxyethyl)-4H-[1,2,4]triazolo[1,5-a]pyrimidin-7-one;

2-[(2,4-dichlorophenyl)methylamino]-5-(4,4-difluorobutyl)-4H-[1,2,4]triazolo[1,5-a]pyrimidin-7-one;

2-[[2-chloro-5-(1-methylpyrazol-3-yl)phenyl]methylamino]-5-(4,4-difluorobutyl)-4H-[1,2,4]triazolo[1,5-a]pyrimidin-7-one;

5-butyl-2-[(5-cyclopropylisoxazol-3-yl)methylamino]-4H-[1,2,4]triazolo[1,5-a]pyrimidin-7-one;

2-[[2-chloro-5-(1-methylpyrazol-3-yl)phenyl]methylamino]-5-(3-methoxypropyl)-4H-[1,2,4]triazolo[1,5-a]pyrimidin-7-one;

5-butyl-2-[(1-phenylpyrazol-3-yl)methylamino]-4H-[1,2,4]triazolo[1,5-a]pyrimidin-7-one;

5-butyl-2-[(5-phenylisoxazol-3-yl)methylamino]-4H-[1,2,4]triazolo[1,5-a]pyrimidin-7-one;

5-butyl-2-[(1-pyrazin-2-ylpyrazol-4-yl)methylamino]-4H-[1,2,4]triazolo[1,5-a]pyrimidin-7-one;

2-[[5-chloro-2-(4-methylpiperazin-1-yl)-4-pyridyl]methylamino]-5-propyl-4H-[1,2,4]triazolo[1,5-a]pyrimidin-7-one;

5-butyl-2-[(2-methyl-5-phenyl-pyrazol-3-yl)methylamino]-4H-[1,2,4]triazolo[1,5-a]pyrimidin-7-one;

2-[(2-chloro-5-pyrimidin-2-yl-phenyl)methylamino]-5-propyl-4H-[1,2,4]triazolo[1,5-a]pyrimidin-7-one;

2-[[5-chloro-2-(1-piperidyl)-4-pyridyl]methylamino]-5-propyl-4H-[1,2,4]triazolo[1,5-a]pyrimidin-7-one;

2-[[2-chloro-5-(4-methylimidazol-1-yl)phenyl]methylamino]-5-propyl-4H-[1,2,4]triazolo[1,5-a]pyrimidin-7-one;

2-[[2-chloro-5-(5-methylimidazol-1-yl)phenyl]methylamino]-5-propyl-4H-[1,2,4]triazolo[1,5-a]pyrimidin-7-one;

2-[(4-morpholinophenyl)methylamino]-5-propyl-4H-[1,2,4]triazolo[1,5-a]pyrimidin-7-one;

2-[(2-chloro-4-morpholino-phenyl)methylamino]-5-propyl-4H-[1,2,4]triazolo[1,5-a]pyrimidin-7-one;

2-[(5-chloro-2-morpholino-4-pyridyl)methylamino]-5-propyl-4H-[1,2,4]triazolo[1,5-a]pyrimidin-7-one;

2-[[5-chloro-2-(3-methoxyazetidin-1-yl)-4-pyridyl]methylamino]-5-propyl-4H-[1,2,4]triazolo[1,5-a]pyrimidin-7-one;

2-[[2-chloro-5-(1-methylpyrazol-3-yl)phenyl]methylamino]-5-propyl-4H-[1,2,4]triazolo[1,5-a]pyrimidine-7-thione;
2-[(2-chloro-5-morpholino-phenyl)methylamino]-5-propyl-4H-[1,2,4]triazolo[1,5-a]pyrimidin-7-one;
2-[(2-chloro-5-pyrimidin-4-yl-phenyl)methylamino]-5-propyl-4H-[1,2,4]triazolo[1,5-a]pyrimidin-7-one;
2-[(2-chloro-4-phenyl-phenyl)methoxy]-5-propyl-4H-[1,2,4]triazolo[1,5-a]pyrimidin-7-one;
2-[[2-chloro-5-(1-methylpyrazol-4-yl)phenyl]methoxy]-5-propyl-4H-[1,2,4]triazolo[1,5-a]pyrimidin-7-one;
2-[(2,4-dichlorophenyl)methylamino]-5-ethyl-4H-[1,2,4]triazolo[1,5-a]pyrimidin-7-one;
2-[(2-chloro-5-pyrimidin-5-yl-phenyl)methylamino]-5-propyl-4H-[1,2,4]triazolo[1,5-a]pyrimidin-7-one;
5-butyl-2-[(2,4-dichlorophenyl)methylamino]-4H-[1,2,4]triazolo[1,5-a]pyrimidin-7-one;
2-[[2-chloro-5-(1-methylpyrazol-3-yl)phenyl]methylamino]-5-methyl-4H-[1,2,4]triazolo[1,5-a]pyrimidin-7-one;
2-[[2-chloro-5-(1-methylpyrazol-3-yl)phenyl]methylamino]-5-ethyl-4H-[1,2,4]triazolo[1,5-a]pyrimidin-7-one;
5-butyl-2-[[2-chloro-5-(1-methylpyrazol-3-yl)phenyl]methylamino]-4H-[1,2,4]triazolo[1,5-a]pyrimidin-7-one;
5-benzyl-2-[[2-chloro-5-(4-pyridyl)phenyl]methylamino]-4H-[1,2,4]triazolo[1,5-a]pyrimidin-7-one;
N-[5-chloro-4-[[(7-oxo-5-propyl-4H-[1,2,4]triazolo[1,5-a]pyrimidin-2-yl)amino]methyl]-2-pyridyl]isoxazole-3-carboxamide;
2-[[2-chloro-5-(1-methylimidazol-4-yl)phenyl]methylamino]-5-propyl-4H-[1,2,4]triazolo[1,5-a]pyrimidin-7-one;
4-(1-methylpyrazol-3-yl)-2-[[(7-oxo-5-propyl-4H-[1,2,4]triazolo[1,5-a]pyrimidin-2-yl)amino]methyl]benzonitrile;
2-[[2-chloro-5-(2-pyridyl)phenyl]methylamino]-5-propyl-4H-[1,2,4]triazolo[1,5-a]pyrimidin-7-one;
2-[(2-chloro-5-pyridazin-3-yl-phenyl)methylamino]-5-propyl-4H-[1,2,4]triazolo[1,5-a]pyrimidin-7-one;
2-[1-(4-phenylphenyl)ethylamino]-5-(trifluoromethyl)-4H-[1,2,4]triazolo[1,5-a]pyrimidin-7-one;
2-[[2-chloro-5-(thiazol-2-ylamino)phenyl]methylamino]-5-propyl-4H-[1,2,4]triazolo[1,5-a]pyrimidin-7-one;
2-[[2-methoxy-5-(1-methylpyrazol-3-yl)phenyl]methylamino]-5-propyl-4H-[1,2,4]triazolo[1,5-a]pyrimidin-7-one;
5-benzyl-2-[[2-chloro-5-(1-methylpyrazol-3-yl)phenyl]methylamino]-4H-[1,2,4]triazolo[1,5-a]pyrimidin-7-one;
2-[[2-chloro-5-(1-methylpyrazol-3-yl)phenyl]methylamino]-5-(2-phenylethyl)-4H-[1,2,4]triazolo[1,5-a]pyrimidin-7-one;
2-[[2-methyl-5-(1-methylpyrazol-3-yl)phenyl]methylamino]-5-propyl-4H-[1,2,4]triazolo[1,5-a]pyrimidin-7-one;
2-[[4-(1-methylpyrazol-3-yl)-2-pyridyl]methylamino]-5-propyl-4H-[1,2,4]triazolo[1,5-a]pyrimidin-7-one;
2-[[5-(1-methylpyrazol-3-yl)-2-(trifluoromethyl)phenyl]methylamino]-5-propyl-4H-[1,2,4]triazolo[1,5-a]pyrimidin-7-one;
2-[[2-chloro-5-(4-pyridyl)phenyl]methylamino]-5-propyl-4H-[1,2,4]triazolo[1,5-a]pyrimidin-7-one;
2-[[2-chloro-5-(1-methylpyrazol-4-yl)phenyl]methylamino]-5-propyl-4H-[1,2,4]triazolo[1,5-a]pyrimidin-7-one;
2-[(2-chloro-5-phenyl-phenyl)methylamino]-5-propyl-4H-[1,2,4]triazolo[1,5-a]pyrimidin-7-one;

5-propyl-2-(6-quinolylmethylamino)-4H-[1,2,4]triazolo[1,5-a]pyrimidin-7-one;
2-[[2-chloro-5-(3-pyridyl)phenyl]methylamino]-5-propyl-4H-[1,2,4]triazolo[1,5-a]pyrimidin-7-one;
2-[1-(2,4-dichlorophenyl)ethylamino]-5-(trifluoromethyl)-4H-[1,2,4]triazolo[1,5-a]pyrimidin-7-one;
2-[1-(2,4-dichlorophenyl)ethylamino]-5-propyl-4H-[1,2,4]triazolo[1,5-a]pyrimidin-7-one;
2-[[2-fluoro-5-(1-methylpyrazol-3-yl)phenyl]methylamino]-5-(trifluoromethyl)-4H-[1,2,4]triazolo[1,5-a]pyrimidin-7-one;
2-[1-(4-phenylphenyl)ethylamino]-5-propyl-4H-[1,2,4]triazolo[1,5-a]pyrimidin-7-one;
2-[[2-chloro-5-(1-methylpyrazol-3-yl)phenyl]methylamino]-5-(trifluoromethyl)-4H-[1,2,4]triazolo[1,5-a]pyrimidin-7-one;
2-[[4-(1-methylpyrazol-3-yl)phenyl]methylamino]-5-(trifluoromethyl)-4H-[1,2,4]triazolo[1,5-a]pyrimidin-7-one;
5-(anilinomethyl)-2-[(2,4-dichlorophenyl)methylamino]-4H-[1,2,4]triazolo[1,5-a]pyrimidin-7-one;
2-[(3-phenylphenyl)methylamino]-5-propyl-4H-[1,2,4]triazolo[1,5-a]pyrimidin-7-one;
2-[(4-benzyloxy-2-chloro-phenyl)methylamino]-5-propyl-4H-[1,2,4]triazolo[1,5-a]pyrimidin-7-one;
2-[[4-(1-methylpyrazol-3-yl)phenyl]methylamino]-5-propyl-4H-[1,2,4]triazolo[1,5-a]pyrimidin-7-one;
2-[[3-(1-methylpyrazol-3-yl)phenyl]methylamino]-5-propyl-4H-[1,2,4]triazolo[1,5-a]pyrimidin-7-one;
2-[[2-fluoro-5-(1-methylpyrazol-3-yl)phenyl]methylamino]-5-propyl-4H-[1,2,4]triazolo[1,5-a]pyrimidin-7-one;
2-[(2,4-dichlorophenyl)methylamino]-5-(2-phenylethyl)-4H-[1,2,4]triazolo[1,5-a][1,3,5]triazin-7-one;
2-[[2-chloro-5-(1-methylpyrazol-3-yl)phenyl]methylamino]-5-propyl-4H-[1,2,4]triazolo[1,5-a]pyrimidin-7-one;
2-[(2-chloro-4-ethoxy-phenyl)methylamino]-5-propyl-4H-[1,2,4]triazolo[1,5-a]pyrimidin-7-one;
2-[[4-(cyclopropoxy)phenyl]methylamino]-5-propyl-4H-[1,2,4]triazolo[1,5-a]pyrimidin-7-one;
2-[(4-imidazol-1-ylphenyl)methylamino]-5-propyl-4H-[1,2,4]triazolo[1,5-a]pyrimidin-7-one;
5-propyl-2-[[4-(2,2,2-trifluoroethoxy)phenyl]methylamino]-4H-[1,2,4]triazolo[1,5-a]pyrimidin-7-one;
3-chloro-4-[[(7-oxo-5-propyl-4H-[1,2,4]triazolo[1,5-a]pyrimidin-2-yl)amino]methyl]benzonitrile;
2-[(2-fluoro-4-methoxy-phenyl)methylamino]-5-propyl-4H-[1,2,4]triazolo[1,5-a]pyrimidin-7-one;
5-propyl-2-[(4-pyrazol-1-ylphenyl)methylamino]-4H-[1,2,4]triazolo[1,5-a]pyrimidin-7-one;
2-[(2-fluoro-4-phenyl-phenyl)methylamino]-5-propyl-4H-[1,2,4]triazolo[1,5-a]pyrimidin-7-one;
2-[(2-chloro-4-phenyl-phenyl)methylamino]-5-propyl-4H-[1,2,4]triazolo[1,5-a]pyrimidin-7-one;
2-[(4-phenylphenyl)methylamino]-5-(trifluoromethyl)-4H-[1,2,4]triazolo[1,5-a]pyrimidin-7-one;
5-(cyclobutylmethyl)-2-[(4-phenylphenyl)methylamino]-4H-[1,2,4]triazolo[1,5-a]pyrimidin-7-one;
2-(1,3-benzoxazol-2-ylmethylamino)-5-propyl-4H-[1,2,4]triazolo[1,5-a]pyrimidin-7-one;
5-benzyl-2-[(4-isopropylphenyl)methylamino]-4H-[1,2,4]triazolo[1,5-a]pyrimidin-7-one;
2-[(2,4-dichlorophenyl)methylamino]-5-(2-phenylethyl)-4H-[1,2,4]triazolo[1,5-a]pyrimidin-7-one;
5-benzyl-2-[(2,4-dichlorophenyl)methylamino]-4H-[1,2,4]triazolo[1,5-a]pyrimidin-7-one;

2-[(4-methoxy-2-methyl-phenyl)methylamino]-5-propyl-4H-[1,2,4]triazolo[1,5-a]pyrimidin-7-one;
2-[(2-chloro-4-methoxy-phenyl)methylamino]-5-propyl-4H-[1,2,4]triazolo[1,5-a]pyrimidin-7-one;
5-propyl-2-[(4-pyrimidin-2-ylphenyl)methylamino]-4H-[1,2,4]triazolo[1,5-a]pyrimidin-7-one;
2-[(2,4-dichlorophenyl)methylamino]-5-(2,2,2-trifluoroethyl)-4H-[1,2,4]triazolo[1,5-a]pyrimidin-7-one;
2-[(4-phenylphenyl)methylamino]-5-propyl-4H-[1,2,4]triazolo[1,5-a]pyrimidin-7-one;
2-[(4-chloro-2-methyl-phenyl)methylamino]-5-propyl-4H-[1,2,4]triazolo[1,5-a]pyrimidin-7-one;
5-(cyclobutylmethyl)-2-[(2,4-dichlorophenyl)methylamino]-4H-[1,2,4]triazolo[1,5-a]pyrimidin-7-one;
2-[(2,4-dichlorophenyl)methylamino]-5-isobutyl-4H-[1,2,4]triazolo[1,5-a]pyrimidin-7-one;
5-(cyclopropylmethyl)-2-[(2,4-dichlorophenyl)methylamino]-4H-[1,2,4]triazolo[1,5-a]pyrimidin-7-one;
2-[(4-chloro-2-fluoro-phenyl)methylamino]-5-propyl-4H-[1,2,4]triazolo[1,5-a]pyrimidin-7-one;
2-[(2,4-dichlorophenyl)methylamino]-5-isopropyl-4H-[1,2,4]triazolo[1,5-a]pyrimidin-7-one;
2-[(2,4-dichlorophenyl)methylamino]-5-(trifluoromethyl)-4H-[1,2,4]triazolo[1,5-a]pyrimidin-7-one;
5-cyclopropyl-2-[(2,4-dichlorophenyl)methylamino]-4H-[1,2,4]triazolo[1,5-a]pyrimidin-7-one;
2-[(2,4-dichlorophenyl)methylamino]-5-propyl-4H-[1,2,4]triazolo[1,5-a]pyrimidin-7-one;
2-[(4-propan-2-ylphenyl)methylamino]-5-propyl-4H-[1,2,4]triazolo[1,5-a]pyrimidin-7-one; and
2-[(4-ethoxyphenyl)methylamino]-5-propyl-4H-[1,2,4]triazolo[1,5-a]pyrimidin-7-one;
or a pharmaceutically acceptable salt or tautomer thereof.

The invention further relates to a compound selected from
5-butyl-2-[[5-chloro-2-(2-oxa-6-azaspiro[3.3]heptan-6-yl)-4-pyridyl]methylamino]-4H-[1,2,4]triazolo[1,5-a]pyrimidin-7-one;
5-butyl-2-[(2-chloro-5-pyrimidin-4-yl-phenyl)methylamino]-4H-[1,2,4]triazolo[1,5-a]pyrimidin-7-one;
2-[[2-chloro-5-(1-methylpyrazol-3-yl)phenyl]methylamino]-5-(4,4-difluorobutyl)-4H-[1,2,4]triazolo[1,5-a]pyrimidin-7-one;
5-butyl-2-[[2-chloro-5-(1-methylpyrazol-3-yl)phenyl]methylamino]-4H-[1,2,4]triazolo[1,5-a]pyrimidin-7-one;
5-benzyl-2-[[2-chloro-5-(4-pyridyl)phenyl]methyl amino]-4H-[1,2,4]triazolo[1,5-a]pyrimidin-7-one; and
5-benzyl-2-[[2-chloro-5-(1-methylpyrazol-3-yl)phenyl]methylamino]-4H-[1,2,4]triazolo[1,5-a]pyrimidin-7-one;
or a pharmaceutically acceptable salt or tautomer thereof.

The synthesis of the compound of formula (I) can, for example, be accomplished according to the following schemes. $R^1$-$R^3$ and $A^1$-$A^3$ are as defined above, unless otherwise specified.

Scheme 1

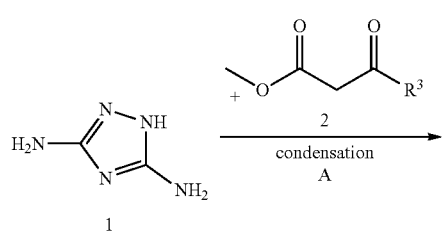

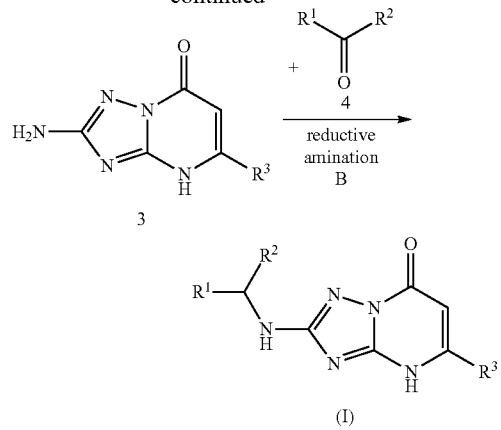

In scheme 1, $R^1$ is methylpiperazinyl(chloropyridinyl), morpholino(chloropyridinyl), morpholino(chloropyrimidinyl), 2-oxa-6-azaspiro[3.3]heptanyl(chloropyridinyl), methylpyrazolyl(chlorophenyl), ortho-para-dichlorophenyl, cyclopropylisoxazolyl, phenylpyrazolyl, phenylisoxazolyl, pyrazinylpyrazolyl, methylpiperazinyl(chloropyridinyl), phenyl(methylpyrazolyl), pyrimidinyl(chorophenyl), piperidyl(chloropyridinyl), methylimidazolyl(chlorophenyl), morpholinophenyl, morpholino(chlorophenyl), morpholino (chloropyridinyl), methoxyazetidinyl(chloropyridinyl), fluorobiphenyl, chlorobiphenyl, pyridinyl(halophenyl), isoxazolylcarbonylamino(chloropyridinyl), methylpyrazolyl (cyanophenyl), pyridazinyl(chlorophenyl), biphenyl, thiazolylamino(chlorophenyl), methylpyrazolyl(methoxyphenyl), methylpyrazolyl(methylphenyl), methylpyrazolyl (pyridinyl), methylpyrazolyl(trifluoromethylphenyl), quinolyl, methylpyrazolylphenyl, phenylmethoxy(chlorophenyl), methoxy(fluorophenyl), ethoxy(chlorophenyl), cyclopropyloxyphenyl, imidazolylphenyl, trifluoroethoxyphenyl, cyano(chlorophenyl), pyrazolylphenyl, pyrimidinylphenyl or (para-ethyloxy)phenyl; $R^2$ is as defined above; and $R^3$ is as defined above with the proviso that $R^3$ is not cyclopropylmethyl or trifluoroethyl.

Step A: Compounds of formula 3 are obtained by condensing 1,3-diaminotriazole 1 with a suitable 0-ketoester 2 in a an acidic solvent such as HCl in MeOH or acetic acid at temperatures between around 60-120° C. for 12-15 hrs.

Step B: Compounds of formula (I) can be obtained by reductive amination of an amino-triazolopyrimidone 3 with an aldehyde or a ketone 4 using NaBH$_3$CN/acetic acid or diethyl 1,4-dihydro-2,6-dimethyl-3,5-pyridine dicarboxylate/scandium(III) trifluoromethanesulfonate as reductant/ (Lewis) acid pair in a solvent such as THF, methanol or ethanol at between around 10-30° C. for 12-14 hrs.

Scheme 2

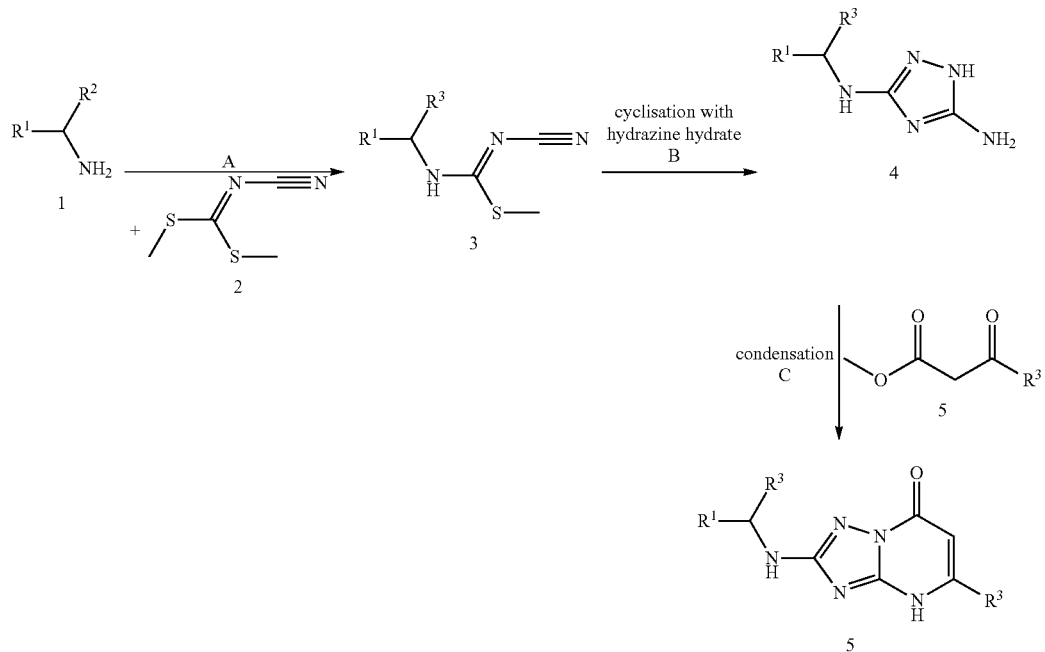

In scheme 2, $R^1$ is methylpyrazolyl(chlorophenyl), ortho-para-dichlorophenyl, ortho-fluoro-para-chlorophenyl, biphenyl, methoxy(chlorophenyl), benzoxazol, isopropylphenyl, methoxy(methylphenyl) or chloro(methylphenyl); $R^2$ is as defined above; and $R^3$ is propyl, isopropyl, isobutyl, cyclopropyl, trifluoromethyl, trifluoroethyl, cyclopropylmethyl, cyclobutylmethyl, phenylmethyl or phenyl ethyl.

Step A: Compounds of formula 3 are obtained by reacting a suitable amine 1 with N-cyanoimido-S,S-dimethyl-dithiocarbonate 2 in a solvent such as ethanol or methanol at a temperature of around 80° C. for 2-12 hrs.

Step B: Compounds of formula 4 are obtained by reacting compounds of formula 3 with hydrazine hydrate in a solvent such as ethanol at a temperature of around 80° C. for 2-12 hrs.

Step C: Compounds of formula (I) can be obtained by condensing compounds of formula 4 with a suitable β-ketoester 5 in an acidic solvent such as HCl in MeOH or acetic acid at temperatures between around 60-120° C. for 12-15 hrs.

Scheme 3

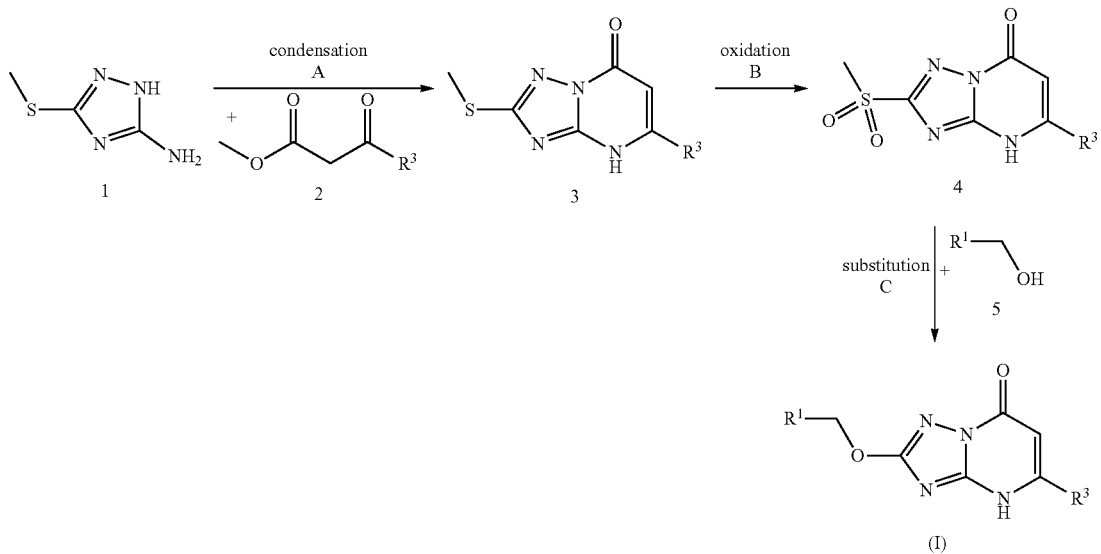

In scheme 3, $R^1$ is alkylpyrazolyl(halophenyl) or halobiphenyl and $R^3$ is alkyl. Conveniently $R^1$ is methylpyrazolyl (chlorophenyl) or chlorobiphenyl. Conveniently $R^3$ is propyl.

Step A: Compounds of formula 3 are prepared by condensing 3-methylsulfanyl-1H-1,2,4-triazol-5-amine 1 with a suitable β-ketoester 2 in an acidic solvent such as HCl in MeOH or acetic acid at between around 60-120° C. for 12-15 hrs.

Step B: Compounds of formula 4 are prepared by oxidizing compounds of formula 3 with an oxidant such as 3-chloroperbenzoic acid in a solvent such as dichloromethane at between around 10-30° C. for 2-24 hrs.

Step C: Compounds of formula (I) can be obtained by reaction sulfones of formula 4 with alcohols 5 in a polar solvent such as DMF using a strong base such as NaH at between around 100-120° C. for 2-12 hrs.

Step B: Compounds of formula 4 are obtained by acylating iminoethers of formula 2 with 1,1'-carbonyl-di(1,2,4-triazole) 3 in a solvent such as dichloromethane between around 10-30° C. for 10-15 hrs.

Step C: Compounds of formula 6 are obtained by condensing compounds of formula 4 with 3,5-diamino-1,2,4-triazole 5 in a solvent such as methanol at around 80° C. for 10-15 hrs.

Step D: Compounds of formula (I) can be obtained by reductive amination of an amino-triazolopyrimidone 6 with an aldehyde 7 using NaBH₃CN/acetic acid, diethyl 1,4-dihydro-2,6-dimethyl-3,5-pyridine dicarboxylate/scandium (III) trifluoromethanesulfonate or BH₃. THF/TMSOTf as reductant/(Lewis) acid pair in a solvent such as THF, methanol or ethanol at between around 10-30° C. for 12-14 hrs.

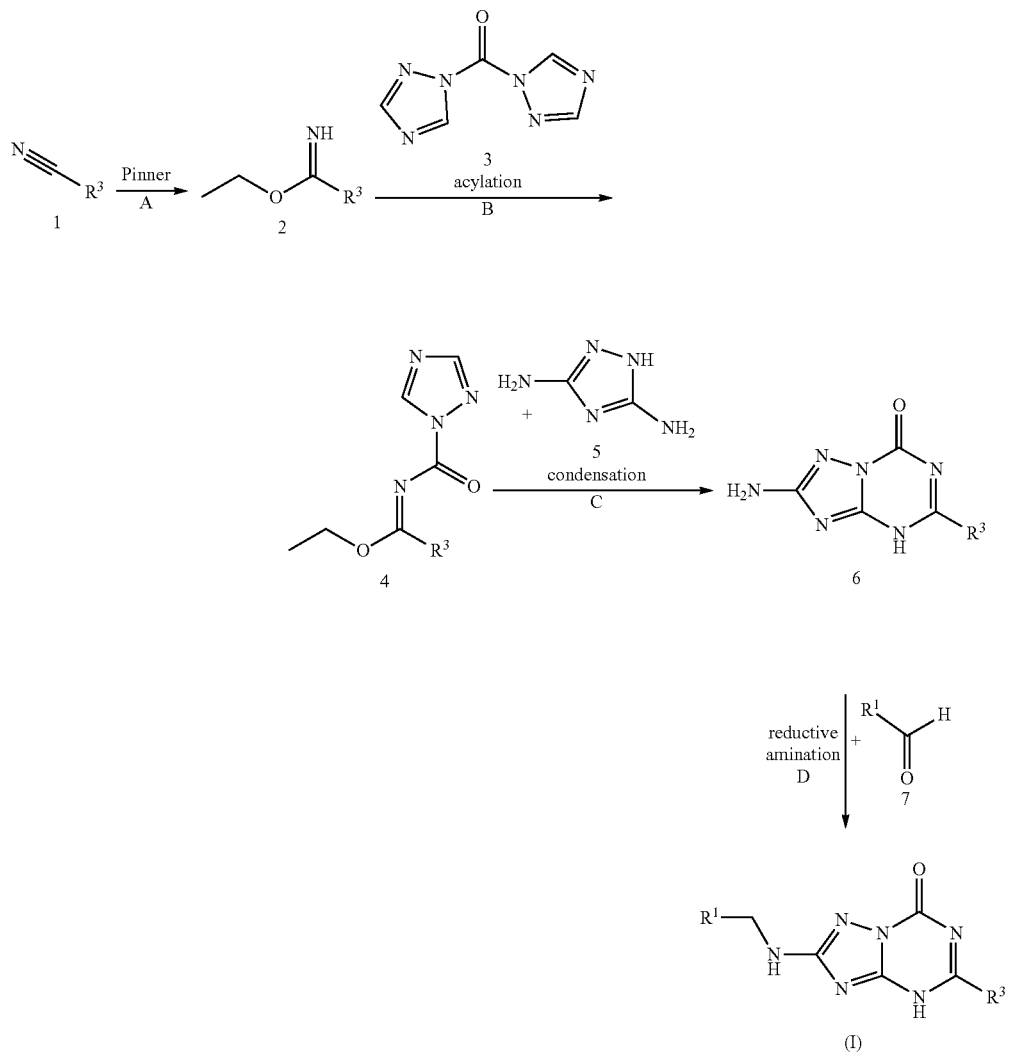

Scheme 4

In scheme 4, $R^1$ is ortho-para-dichlorophenyl and $R^3$ is phenylalkyl. Conveniently $R^3$ is phenylethyl.

Step A: Iminoethers of formula 2 can be obtained by reacting a suitable nitrile 1 in ethanol with HCl at around 0° C. for 2-12 hrs.

Synthesis of Intermediates

Aldehydes of formula (C) are either commercially available or can be prepared by the methods in Scheme 5 or by methods known to those skilled in the art.

Scheme 5

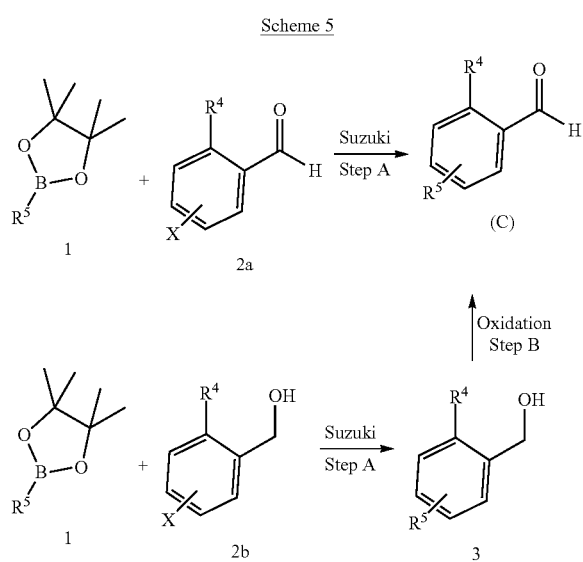

In scheme 5, X is halo; and $R^4$ is hydrogen, chloro, fluoro, methyl, methoxy, trifluoromethyl or cyano. $R^5$ is phenyl, pyrimidinyl, pyrazolyl, alkylpyrazolyl, imidazolyl, alkylimidazolyl, alkylimidazolyl, pyridyl, pyrazinyl or pyridazinyl. Conveniently X is bromo.

Step A: Coupling of the haloderivative 2a or 2b with a suitable boronic acid or boronic acid ester 1 can be accomplished by using a palladium catalyst such as palladium(II)-acetate, palladium(II)-chloride, 1,1'-bis(diphenylphosphino)ferrocene-palladium(II)dichloride dichloromethane complex, tris(dibenzylideneacetone)dipalladium, tris(dibenzylideneacetone)dipalladium-chloroform adduct, or tetrakis(triphenylphosphine)palladium(0) in combination with a ligand, a base and a suitable solvent. Conveniently the ligand can be selected from triphenylphosphine, tricyclohexylphosphine, X-phos, Xanthphos or the like, and the base can be potassium phosphate, potassium carbonate, cesium carbonate, triethylamine or diisopropylethylamine. Conveniently the reaction is performed in a suitable solvent selected from dioxane, toluene, dimethylacetamide, dimethylformamide, tetrahydrofuran, dimethoxyethane, diglyme, ethanol, methanol, water or mixtures of the solvents mentioned above at between around 20° C. to around 180° C. for between 5 min to 18 hrs with or without microwave irradiation.

Step B: Oxidation of benzylic alcohols 3 to obtain aldehydes of formula (C) can be accomplished for example by $MnO_2$ in a solvent such as dichloromethane or dichlorethane or by 2-iodoxybenzoic acid in a solvent such as dichloromethane/DMSO at 0° C.-RT for 2-12 hrs.

Alternatively, acohols of formula (D) and aldehydes of formula (E) can be commercially available, or can be prepared by the methods in Scheme 6 or by methods known to those skilled in the art.

Scheme 6

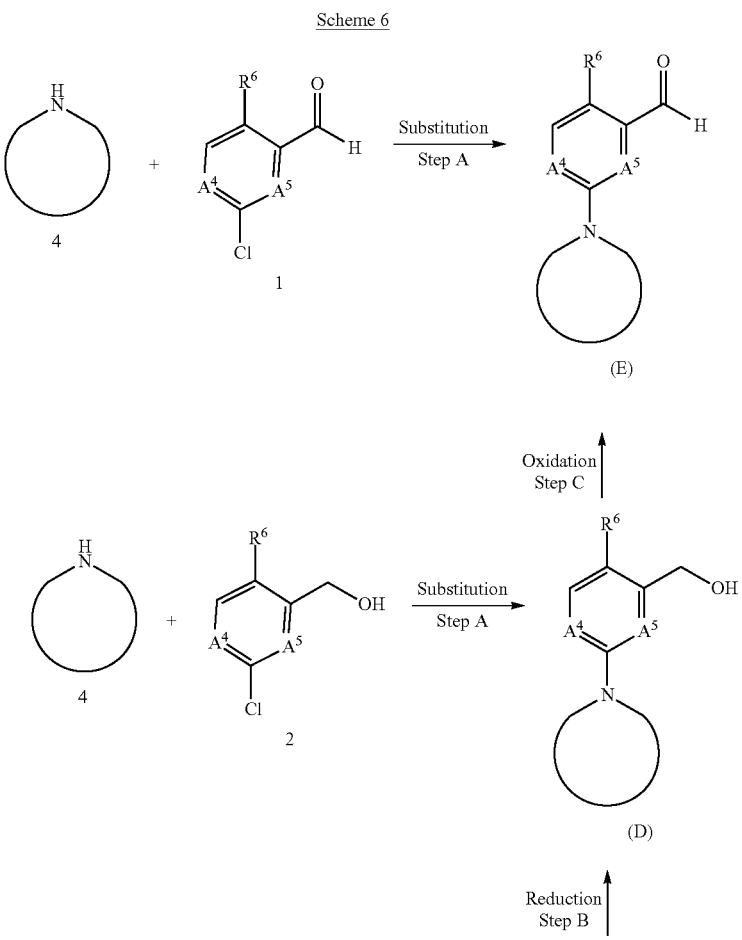

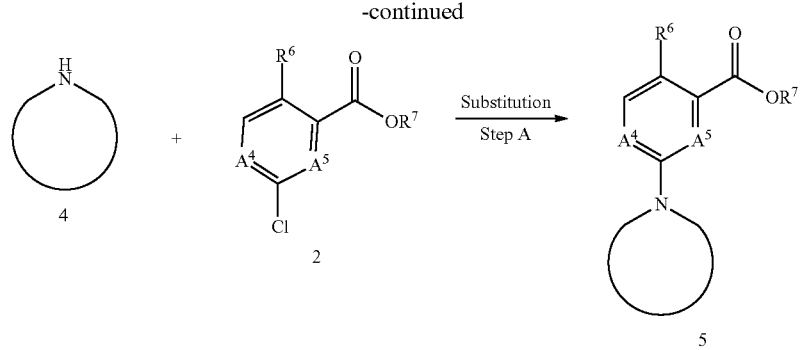

In scheme 6, $A^4$ and $A^5$ are independently selected from —CH— and nitrogen; $R^6$ is chloro; and $R^7$ is hydrogen or alkyl. In scheme 6, compound 4 is selected from morpholino, methoxyazetidinyl, piperidinyl, methylpiperazinyl and 2-oxa-6-azaspiro[3.3]heptanyl.

Step A: Heterocylic amines are coupled via nucleophilic substitution to heteroaromatics by reacting an aldehyde 1, an alcohol 2 or a carboxylic acid or ester 3 with a suitable amine 4, optionally in the presence of a base such as $K_2CO_3$, $CsCO_3$ in a solvent such as DMF, NMP, DMA, DMSO at 80-100° C. 8-15 hrs.

Step B: Alcohols of formula (D) can be obtained from ester 5 through a reduction with a reductive agent such as $LiBH_4$ or $NaBH_4$ in a solvent such as THF or MeOH at RT for 2-12 hrs or alternatively from a carboxylic acid 5 with a reductant such as $BH_3 \cdot Me2S$ in a solvent such as THF at RT for 2-12 hrs.

Step C: Oxidation of benzylic alcohols of formula (D) to obtain aldehydes of formula (E) can be accomplished for example by $MnO_2$ in a solvent such as dichloromethane or dichlorethane or by 2-iodoxybenzoic acid in a solvent such as dichloromethane/DMSO at 0° C.—RT for 2-12 hrs.

Alternatively, acohols of formula (F) and aldehydes of formula (G) can be commercially available, or can be prepared by the methods in Scheme 7 or by methods known to those skilled in the art.

Scheme 7

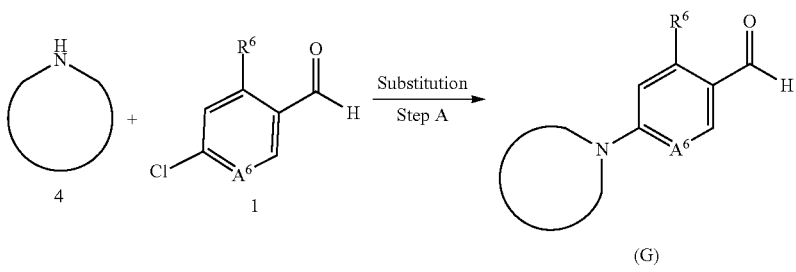

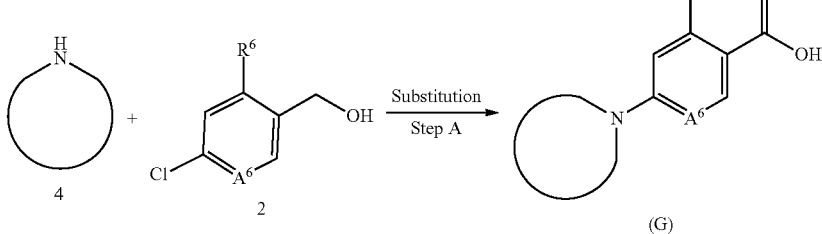

-continued

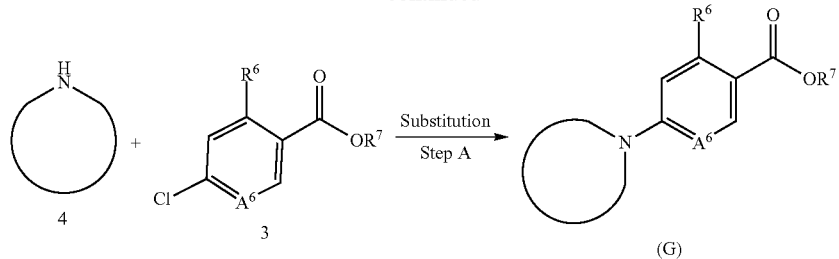

In scheme 7, $A^6$ is —CH— or nitrogen; $R^6$ is hydrogen or chloro; and $R^7$ is hydrogen or alkyl. In scheme 7, compound 4 can be morpholino or methylpiperazinyl.

Step A: Heterocylic amines are coupled via nucleophilic substitution to heteroaromatics by reacting an aldehyde 1, an alcohol 2 or a carboxylic acid or ester 3 with a suitable amine 4, optionally in the presence of a base such as $K_2CO_3$, $CsCO_3$ in a solvent such as DMF, NMP, DMA, DMSO at 80-100° C. 8-15 hrs.

Step B: Alcohols of formula (F) can be obtained from ester 5 through a reduction with a reductive agent such as $LiBH_4$ or $NaBH_4$ in a solvent such as THF or MeOH at RT for 2-12 hrs or alternatively from a carboxylic acid 5 with a reductant such as $BH_3 \cdot Me_2S$ in a solvent such as THF at RT for 2-12 hrs.

Step C: Oxidation of benzylic alcohols of formula (F) to obtain aldehydes of formula (G) can be accomplished for example by $MnO_2$ in a solvent such as dichloromethane or dichlorethane or by 2-iodoxybenzoic acid in a solvent such as dichloromethane/DMSO at 0° C.-RT for 2-12 hrs.

The invention thus also relates to a process for the preparation of a compound according to the invention comprising one of the following steps:

(a) the reaction of a compound of formula (B1)

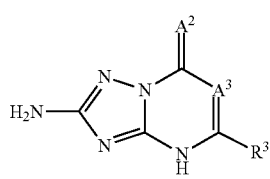

(B1)

with a compound of formula (B2)

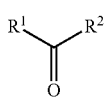

(B2)

in the presence of a reducing agent and a Lewis acid; or (b) the reaction of a compound of formula (C1)

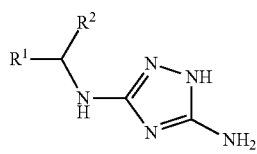

(C1)

with a compound of formula (C2)

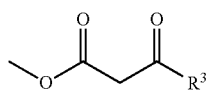

(C2)

in the presence of an acid;
wherein $R^1$-$R^3$ and $A^1$-$A^3$ are as defined above.

The reducing agent of step (a) can advantageously be $NaBH_3CN$ or diethyl 1,4-dihydro-2,6-dimethyl-3,5-pyridine dicarboxylate.

The Lewis acid of step (a) can be acetic acid or scandium (III) trifluoromethanesulfonate.

The solvent of step (a) can advantageously be THF, methanol or ethanol.

Convenient conditions for step (a) are between around 0° C. to 80° C., in particular between around 10° C. to 60° C., more particular between around 10° C. to 40° C. during 1-24 hrs, advantageously during 12-14 hrs.

In step (b), the acid can be HCl or acetic acid.

In step (b), the solvent is advantageously methanol or acetic acid.

Convenient conditions for step (b) are between around 20° C.-200° C., in particular between around 40° C.-150° C., more particular between around 60° C.-120° C. during 1-24 hrs, advantageously during 10-15 hrs.

The invention also relates to a compound according to the invention when manufactured according to a process of the invention.

Another embodiment of the invention provides a pharmaceutical composition or medicament containing a compound of the invention and a therapeutically inert carrier, diluent or excipient, as well as a method of using the compounds of the invention to prepare such composition and medicament. In one example, the compound of formula (I) may be formulated by mixing at ambient temperature at the appropriate pH, and at the desired degree of purity, with physiologically acceptable carriers, i.e., carriers that are non-toxic to recipients at the dosages and concentrations employed into a galenical administration form. The pH of the formulation depends mainly on the particular use and the concentration of compound, but preferably ranges anywhere from about 3 to about 8.

In one example, a compound of formula (I) is formulated in an acetate buffer, at pH 5. In another embodiment, the compound of formula (I) is sterile. The compound may be stored, for example, as a solid or amorphous composition, as a lyophilized formulation or as an aqueous solution.

Compositions are formulated, dosed, and administered in a fashion consistent with good medical practice. Factors for consideration in this context include the particular disorder being treated, the particular mammal being treated, the clinical condition of the individual patient, the cause of the disorder, the site of delivery of the agent, the method of administration, the scheduling of administration, and other factors known to medical practitioners.

The compounds of the invention may be administered by any suitable means, including oral, topical (including buccal and sublingual), rectal, vaginal, transdermal, parenteral, subcutaneous, intraperitoneal, intrapulmonary, intradermal, intrathecal, epidural and intranasal, and if desired for local treatment, intralesional administration. Parenteral infusions include intramuscular, intravenous, intraarterial, intraperitoneal, or subcutaneous administration.

The compounds of the present invention may be administered in any convenient administrative form, e.g., tablets, powders, capsules, solutions, dispersions, suspensions, syrups, sprays, suppositories, gels, emulsions, patches, etc. Such compositions may contain components conventional in pharmaceutical preparations, e.g., diluents, carriers, pH modifiers, sweeteners, bulking agents, and further active agents.

A typical formulation is prepared by mixing a compound of the present invention and a carrier or excipient. Suitable carriers and excipients are well known to those skilled in the art and are described in detail in, e.g., Ansel, Howard C., et al., Ansel's Pharmaceutical Dosage Forms and Drug Delivery Systems. Philadelphia: Lippincott, Williams & Wilkins, 2004; Gennaro, Alfonso R., et al. Remington: The Science and Practice of Pharmacy. Philadelphia: Lippincott, Williams & Wilkins, 2000; and Rowe, Raymond C. Handbook of Pharmaceutical Excipients. Chicago, Pharmaceutical Press, 2005. The formulations may also include one or more buffers, stabilizing agents, surfactants, wetting agents, lubricating agents, emulsifiers, suspending agents, preservatives, antioxidants, opaquing agents, glidants, processing aids, colorants, sweeteners, perfuming agents, flavoring agents, diluents and other known additives to provide an elegant presentation of the drug (i.e., a compound of the present invention or pharmaceutical composition thereof) or aid in the manufacturing of the pharmaceutical product (i.e., medicament).

The invention also relates in particular to a compound of formula (I) or a compound selected from
2-[(4-benzyloxyphenyl)methylamino]-5-propyl-4H-[1,2,4]triazolo[1,5-a]pyrimidin-7-one;
2-[(4-propan-2-yloxyphenyl)methylamino]-5-propyl-4H-[1,2,4]triazolo[1,5-a]pyrimidin-7-one; and
2-[(2-chlorophenyl)methylamino]-5-[(2-fluoroanilino)methyl]-4H-[1,2,4]triazolo[1,5-a]pyrimidin-7-one;
or a pharmaceutically acceptable salt or tautomer thereof; for use as therapeutically active substance.

The invention also relates in particular to a pharmaceutical composition comprising a compound of formula (I) or a compound selected from
2-[(4-benzyloxyphenyl)methylamino]-5-propyl-4H-[1,2,4]triazolo[1,5-a]pyrimidin-7-one;
2-[(4-propan-2-yloxyphenyl)methylamino]-5-propyl-4H-[1,2,4]triazolo[1,5-a]pyrimidin-7-one; and
2-[(2-chlorophenyl)methylamino]-5-[(2-fluoroanilino)methyl]-4H-[1,2,4]triazolo[1,5-a]pyrimidin-7-one;
or a pharmaceutically acceptable salt or tautomer thereof; and a therapeutically inert carrier.

The invention also relates in particular to a compound of formula (I) or a compound selected from
2-[(4-benzyloxyphenyl)methylamino]-5-propyl-4H-[1,2,4]triazolo[1,5-a]pyrimidin-7-one;
2-[(4-propan-2-yloxyphenyl)methylamino]-5-propyl-4H-[1,2,4]triazolo[1,5-a]pyrimidin-7-one; and
2-[(2-chlorophenyl)methylamino]-5-[(2-fluoroanilino)methyl]-4H-[1,2,4]triazolo[1,5-a]pyrimidin-7-one;
or a pharmaceutically acceptable salt or tautomer thereof; for use in the treatment of a disease modulated by cGAS.

The invention also relates in particular to the use of a compound of formula (I) or a compound selected from
2-[(4-benzyloxyphenyl)methylamino]-5-propyl-4H-[1,2,4]triazolo[1,5-a]pyrimidin-7-one;
2-[(4-propan-2-yloxyphenyl)methylamino]-5-propyl-4H-[1,2,4]triazolo[1,5-a]pyrimidin-7-one; and
2-[(2-chlorophenyl)methylamino]-5-[(2-fluoroanilino)methyl]-4H-[1,2,4]triazolo[1,5-a]pyrimidin-7-one;
or a pharmaceutically acceptable salt or tautomer thereof; for the treatment or prophylaxis of systemic lupus erythrematosus (SLE), cutaneous skin diseases like dermatomyositis or cutaneous lupus, interstitial pulmonary fibrosis, Sjogren syndrome, type I diabetes, inflammatory bowel disease, non-alcoholic steatohepatitis (NASH), juvenile inflammatory arthritis, ankylosing spondylitis, gout or Aicardi-Goutieres syndrome (AGS).

The invention also relates in particular to the use of a compound of formula (I) or a compound selected from
2-[(4-benzyloxyphenyl)methylamino]-5-propyl-4H-[1,2,4]triazolo[1,5-a]pyrimidin-7-one;
2-[(4-propan-2-yloxyphenyl)methylamino]-5-propyl-4H-[1,2,4]triazolo[1,5-a]pyrimidin-7-one; and
2-[(2-chlorophenyl)methylamino]-5-[(2-fluoroanilino)methyl]-4H-[1,2,4]triazolo[1,5-a]pyrimidin-7-one;
or a pharmaceutically acceptable salt or tautomer thereof; for the preparation of a medicament for the treatment or prophylaxis of systemic lupus erythrematosus (SLE), cutaneous skin diseases like dermatomyositis or cutaneous lupus, interstitial pulmonary fibrosis, Sjogren syndrome, type I diabetes, inflammatory bowel disease, non-alcoholic steatohepatitis (NASH), juvenile inflammatory arthritis, ankylosing spondylitis, gout or Aicardi-Goutieres syndrome (AGS).

The invention also relates in particular to a compound of formula (I) or a compound selected from
2-[(4-benzyloxyphenyl)methylamino]-5-propyl-4H-[1,2,4]triazolo[1,5-a]pyrimidin-7-one;
2-[(4-propan-2-yloxyphenyl)methylamino]-5-propyl-4H-[1,2,4]triazolo[1,5-a]pyrimidin-7-one; and
2-[(2-chlorophenyl)methylamino]-5-[(2-fluoroanilino)methyl]-4H-[1,2,4]triazolo[1,5-a]pyrimidin-7-one;
or a pharmaceutically acceptable salt or tautomer thereof; for use in the treatment or prophylaxis of systemic lupus erythrematosus (SLE), cutaneous skin diseases like dermatomyositis or cutaneous lupus, interstitial pulmonary fibrosis, Sjogren syndrome, type I diabetes, inflammatory bowel disease, non-alcoholic steatohepatitis (NASH), juvenile inflammatory arthritis, ankylosing spondylitis, gout or Aicardi-Goutieres syndrome (AGS).

The invention also relates in particular to a method for the treatment or prophylaxis of systemic lupus erythrematosus (SLE), cutaneous skin diseases like dermatomyositis or cutaneous lupus, interstitial pulmonary fibrosis, Sjogren syndrome, type I diabetes, inflammatory bowel disease, non-alcoholic steatohepatitis (NASH), juvenile inflammatory arthritis, ankylosing spondylitis, gout or Aicardi-Goutieres syndrome (AGS), which method comprises administering an effective amount of a compound of formula (I) or a compound selected from 2-[(4-benzyloxyphenyl)methylamino]-5-propyl-4H-[1,2,4]triazolo[1,5-a]pyrimidin-7-one;

2-[(4-propan-2-yloxyphenyl)methylamino]-5-propyl-4H-[1,2,4]triazolo[1,5-a]pyrimidin-7-one; and 2-[(2-chlorophenyl)methyl amino]-5-[(2-fluoroanilino)methyl]-4H-[1,2,4]triazolo[1,5-a]pyrimidin-7-one;

or a pharmaceutically acceptable salt or tautomer thereof;

to a patient in need thereof.

The invention will now be illustrated by the following examples which have no limiting character.

EXAMPLES

Abbreviations

ATP=adenosine triphosphate; BSA=bovine serum albumine; DCM=dichloromethane; DIEA=diisopropylethylamine; DMA=dimethylacetamide; DMF=dimethylformamide; DMSO=dimethyl sulfoxide; DNA=deoxyribonucleic acid; ESI=electrospray ionization; EtOAc=ethyl acetate; EtOH=ethanol; GTP=guanosine triphosphate; HPLC=high performance liquid chromatography; MeOH=methanol; MS=mass spectrometry; NMP=N-methyl-2-pyrrolidone; RT =room temperature; SD=standard deviation; TFA=trifluoroacetic acid; THF=tetrahydrofuran; TLC=thin-layer chromatography; TMSOTf=trimethylsilyl trifluoromethanesulfonate; TRIS=tris(hydroxymethyl)aminomethane.

Example 1

2-[(2-Fluoro-4-phenyl-phenyl)methylamino]-5-propyl-4H-[1,2,4]triazolo[1,5-a]pyrimidin-7-one

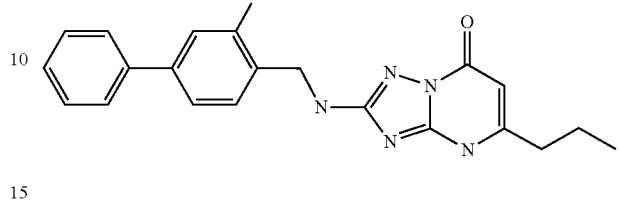

Step 1: 2-Amino-5-propyl-4H-[1,2,4]triazolo[1,5-a]pyrimidin-7-one

To a solution of 3,5-diamino-1,2,4-triazole (3.0 g, 30.3 mmol) in acetic acid (30 mL) was added methyl 3-oxohexanoate (4.8 g, 33.3 mmol),then the mixture was stirred at 120° C. for 8 hrs. The mixture was concentrated. The crude solid was triturated in EtOH, filtered and dried in vacuum to give the title compound (1800 mg, 25% yield) as a light yellow solid.

Step 2: 2-[(2-Fluoro-4-phenyl-phenyl)methyl-amino]-5-propyl-4H-[1,2,4]triazolo[1,5-a]pyrimidin-7-one To a solution of 2-fluoro-4-phenyl-benzaldehyde (199 mg, 1 mmol) and 2-amino-5-propyl-4H-[1,2,4]triazolo[1,5-a]pyrimidin-7-one (0.75 mL, 0.83 mmol), acetic acid (0.09 mL, 1.66 mmol) in methanol (15 mL) was added NaBH$_3$CN (78 mg, 1.24 mmol), then the mixture was stirred at 25° C. for 16 h. Then, the mixture was concentrated and purified by prep-HPLC, lyophilized to give the title compound (106 mg, 34%) as a white solid. MS: 378.3 [M+H]$^+$ ESI pos.

In analogy to the procedures described in example 1, examples 2-57 (table 1) were prepared starting from suitable aldehyde and beta-ketoester starting materials.

TABLE 1

| Ex. | Structure | Systematic name | MS |
|---|---|---|---|
| 2 | (structure) | 5-propyl-2-[(4-pyrimidin-2-yl-phenyl)methylamino]-4H-[1,2,4]-triazolo[1,5-a]pyrimidin-7-one; | 362.1 [M + H]+ |
| 3 | (structure) | 5-(cyclobutylmethyl)-2-[(4-phenylphenyl)methylamino]-4H-[1,2,4]triazolo[1,5-a]pyrimidin-7-one | 386.2 [M + H]+ |
| 4 | (structure) | 2-[(2-chloro-4-phenylphenyl)-methylamino]-5-propyl-4H-[1,2,4]triazolo[1,5-a]pyrimidin-7-one | 394.2 [M + H]+ |

TABLE 1-continued

| Ex. | Structure | Systematic name | MS |
|---|---|---|---|
| 5 | | 5-propyl-2-[(4-pyrazol-1-yl-phenyl)methylamino]-4H-[1,2,4]-triazolo[1,5-a]pyrimidin-7-one | 350.3 [M + H]+ |
| 6 | | 2-[(2-fluoro-4-methoxyphenyl)-methylamino]-5-propyl-4H-[1,2,4]triazolo[1,5-a]pyrimidin-7-one | 332.5 [M + H]+ |
| 7 | | 3-chloro-4-[[(7-oxo-5-propyl-4H-[1,2,4]triazolo[1,5-a]-pyrimidin-2-yl)amino]methyl]-benzonitrile | 343.4 [M + H]+ |
| 8 | | 5-propyl-2-[[4-(2,2,2-trifluoro-ethoxy)phenyl]methylamino]-4H-[1,2,4]triazolo[1,5-a]-pyrimidin-7-one | 382.2 [M + H]+ |
| 9 | | 2-[(4-imidazol-1-ylphenyl)methylamino]-5-propyl-4H-[1,2,4]-triazolo[1,5-a]pyrimidin-7-one | 350.2 [M + H]+ |
| 10 | | 2-[[4-(cyclopropoxy)phenyl]-methylamino]-5-propyl-4H-[1,2,4]triazolo[1,5-a]pyrimidin-7-one | 340.2 [M + H]+ |
| 11 | | 2-[(2-chloro-4-ethoxyphenyl)-methylamino]-5-propyl-4H-[1,2,4]triazolo[1,5-a]pyrimidin-7-one | 362.2 [M + H]+ |
| 12 | | 2-[[2-fluoro-5-(1-methylpyrazol-3-yl)phenyl]methylamino]-5-propyl-4H-[1,2,4]triazolo[1,5-a]pyrimidin-7-one | 382.3 [M + H]+ |

TABLE 1-continued

| Ex. | Structure | Systematic name | MS |
|---|---|---|---|
| 13 | | 2-[[3-(1-methylpyrazol-3-yl)-phenyl]methylamino]-5-propyl-4H-[1,2,4]triazolo[1,5-a]-pyrimidin-7-one | 364.4 [M + H]+ |
| 14 | | 2-[[4-(1-methylpyrazol-3-yl)-phenyl]methylamino]-5-propyl-4H-[1,2,4]triazolo[1,5-a]-pyrimidin-7-one | 364.4 [M + H]+ |
| 15 | | 2-[(4-benzyloxy-2-chlorophenyl)-methylamino]-5-propyl-4H-[1,2,4]triazolo[1,5-a]pyrimidin-7-one | 424.2 [M + H]+ |
| 16 | | 2-[(3-phenylphenyl)methyl-amino]-5-propyl-4H-[1,2,4]-triazolo[1,5-a]pyrimidin-7-one | 360.2 [M + H]+ |
| 17 | | 2-[(4-benzyloxyphenyl)methyl-amino]-5-propyl-4H-[1,2,4]-triazolo[1,5-a]pyrimidin-7-one | 390.3 [M + H]+ |
| 18 | | 2-[[4-(1-methylpyrazol-3-yl)-phenyl]methylamino]-5-(trifluoromethyl)-4H-[1,2,4]-triazolo[1,5-a]pyrimidin-7-one | 390.3 [M + H]+ |
| 19 | | 2-[[2-chloro-5-(1-methylpyrazol-3-yl)phenyl]methylamino]-5-(trifluoromethyl)-4H-[1,2,4]-triazolo[1,5-a]pyrimidin-7-one | 424.0 [M + H]+ |
| 20 | | 2-[[2-fluoro-5-(1-methylpyrazol-3-yl)phenyl]methylamino]-5-(trifluoromethyl)-4H-[1,2,4]-triazolo[1,5-a]pyrimidin-7-one | 408.2 [M + H]+ |

TABLE 1-continued

| Ex. | Structure | Systematic name | MS |
|---|---|---|---|
| 21 | | 2-[[2-chloro-5-(3-pyridyl)phenyl]-methylamino]-5-propyl-4H-[1,2,4]triazolo[1,5-a]pyrimidin-7-one | 394.9 [M + H]+ |
| 22 | | 5-propyl-2-(6-quinolylmethylamino)-4H-[1,2,4]triazolo[1,5-a]pyrimidin-7-one | 335.2 [M + H]+ |
| 23 | | 2-[(2-chloro-5-phenylphenyl)-methylamino]-5-propyl-4H-[1,2,4]triazolo[1,5-a]pyrimidin-7-one | 394.2 [M + H]+ |
| 24 | | 2-[[2-chloro-5-(1-methylpyrazol-4-yl)phenyl]methylamino]-5-propyl-4H-[1,2,4]triazolo[1,5-a]pyrimidin-7-one | 398.1 [M + H]+ |
| 25 | | 2-[[2-chloro-5-(4-pyridyl)phenyl]methylamino]-5-propyl-4H-[1,2,4]triazolo[1,5-a]pyrimidin-7-one | 395.3 [M + H]+ |
| 26 | | 2-[[2-chloro-5-(1-methylpyrazol-3-yl)phenyl]methylamino]-5-(2-phenylethyl)-4H-[1,2,4]-triazolo[1,5-a]pyrimidin-7-one | 460.3 [M + H]+ |
| 27 | | 5-benzyl-2-[[2-chloro-5-(1-methylpyrazol-3-yl)phenyl]-methylamino]-4H-[1,2,4]-triazolo[1,5-a]pyrimidin-7-one | 446.2 [M + H]+ |

TABLE 1-continued

| Ex. | Structure | Systematic name | MS |
|---|---|---|---|
| 28 | | 2-[[2-methoxy-5-(1-methyl-pyrazol-3-yl)phenyl]methyl-amino]-5-propyl-4H-[1,2,4]-triazolo[1,5-a]pyrimidin-7-one | 394.1 [M + H]+ |
| 29 | | 2-[[2-chloro-5-(2-pyridyl)phen-yl]methylamino]-5-propyl-4H-[1,2,4]triazolo[1,5-a]pyrimidin-7-one | 395.5 [M + H]+ |
| 30 | | 2-[[2-chloro-5-(1-methylimid-azol-4-yl)phenyl]methylamino]-5-propyl-4H-[1,2,4]triazolo[1,5-a]pyrimidin-7-one | 398.2 [M + H]+ |
| 31 | | 5-benzyl-2-[[2-chloro-5-(4-pyridyl)phenyl]methylamino]-4H-[1,2,4]triazolo[1,5-a]-pyrimidin-7-one | 443.2 [M + H]+ |
| 32 | | 5-butyl-2-[[2-chloro-5-(1-methyl-pyrazol-3-yl)phenyl]methyl-amino]-4H-[1,2,4]triazolo[1,5-a]pyrimidin-7-one | 412.2 [M + H]+ |
| 33 | | 2-[[2-chloro-5-(1-methylpyrazol-3-yl)phenyl]methylamino]-5-ethyl-4H-[1,2,4]triazolo[1,5-a]pyrimidin-7-one | 384.2 [M + H]+ |

TABLE 1-continued

| Ex. | Structure | Systematic name | MS |
|---|---|---|---|
| 34 | | 2-[[2-chloro-5-(1-methylpyrazol-3-yl)phenyl]methylamino]-5-methyl-4H-[1,2,4]triazolo[1,5-a]-pyrimidin-7-one | 370.2 [M + H]+ |
| 35 | | 5-butyl-2-[(2,4-dichlorophenyl)methylamino]-4H-[1,2,4]-triazolo-[1,5-a]pyrimidin-7-one | 366.1 [M + H]+ |
| 36 | | 2-[(2-chloro-5-pyrimidin-5-yl-phenyl)methylamino]-5-propyl-4H-[1,2,4]triazolo[1,5-a]-pyrimidin-7-one | 396.2 [M + H]+ |
| 37 | | 2-[(2,4-dichlorophenyl)methylamino]-5-ethyl-4H-[1,2,4]-triazolo[1,5-a]pyrimidin-7-one | 338.1 [M + H]+ |
| 38 | | 2-[(2-chloro-5-pyrimidin-4-yl-phenyl)methylamino]-5-propyl-4H-[1,2,4]triazolo[1,5-a]-pyrimidin-7-one | 396.0 [M + H]+ |
| 39 | | 2-[(2-chloro-5-morpholinophenyl)methylamino]-5-propyl-4H-[1,2,4]triazolo[1,5-a]pyrimidin-7-one | 403.4 [M + H]+ |
| 40 | | 2-[[2-chloro-5-(1-methylpyrazol-3-yl)phenyl]methylamino]-5-propyl-4H-[1,2,4]triazolo[1,5-a]-pyrimidine-7-thione | 413.9 [M + H]+ |

TABLE 1-continued

| Ex. | Structure | Systematic name | MS |
|---|---|---|---|
| 41 | | 2-[(2-chloro-4-morpholino-phenyl)methylamino]-5-propyl-4H-[1,2,4]triazolo[1,5-a]-pyrimidin-7-one | 403.2 [M + H]+ |
| 42 | | 2-[(4-morpholinophenyl)meth-amino]-5-propyl-4H-[1,2,4]-triazolo[1,5-a]pyrimidin-7-one | 369.2 [M + H]+ |
| 43 | | 2-[(2-chloro-5-pyrimidin-2-yl-phenyl)methylamino]-5-propyl-4H-[1,2,4]triazolo[1,5-a]-pyrimidin-7-one | 395.9 [M + H]+ |
| 44 | | 5-butyl-2-[(2-methyl-5-phenyl-pyrazol-3-yl)methylamino]-4H-[1,2,4]triazolo[1,5-a]pyrimidin-7-one | 378.3 [M + H]+ |
| 45 | | 5-butyl-2-[(1-pyrazin-2-ylpyr-azol-4-yl)methylamino]-4H-[1,2,4]triazolo[1,5-a]pyrimidin-7-one | 366.1 [M + H]+ |
| 46 | | 5-butyl-2-[(5-phenylisoxazol-3-yl)methylamino]-4H-[1,2,4]-triazolo[1,5-a]pyrimidin-7-one-5-butyl-2-[(5-phenylisoxazol-3-yl)methylamino]-4H-[1,2,4]-triazolo[1,5-a]pyrimidin-7-one | 365.1 [M + H]+ |
| 47 | | 5-butyl-2-[(1-phenylpyrazol-3-yl)methylamino]-4H-[1,2,4]-triazolo[1,5-a]pyrimidin-7-one | 364.1 [M + H]+ |
| 48 | | 2-[[2-chloro-5-(1-methylpyrazol-3-yl)phenyl]methylamino]-5-(3-methoxypropyl)-4H-[1,2,4]-triazolo[1,5-a]pyrimidin-7-one | 428.1 [M + H]+ |

TABLE 1-continued

| Ex. | Structure | Systematic name | MS |
|---|---|---|---|
| 49 | | 5-butyl-2-[(5-cyclopropylisoxazol-3-yl)methylamino]-4H-[1,2,4]triazolo[1,5-a]pyrimidin-7-one | 329.2 [M + H]+ |
| 50 | | 2-[[2-chloro-5-(1-methylpyrazol-3-yl)phenyl]methylamino]-5-(4,4-difluorobutyl)-4H-[1,2,4]-triazolo[1,5-a]pyrimidin-7-one | 448.4 [M + H]+ |
| 51 | | 2-[[2-chloro-5-(1-methylpyrazol-3-yl)phenyl]methylamino]-5-(2-methoxyethyl)-4H-[1,2,4]-triazolo[1,5-a]pyrimidin-7-one | 414.1 [M + H]+ |
| 52 | | 2-[(2,4-dichlorophenyl)methylamino]-5-(4,4-difluorobutyl)-4H-[1,2,4]triazolo[1,5-a]-pyrimidin-7-one | 402.4 [M + H]+ |
| 53 | | 2-[(4-propan-2-yloxyphenyl)-methylamino]-5-propyl-4H-[1,2,4]triazolo[1,5-a]pyrimidin-7-one | n.a. |
| 54 | | 2-[(4-ethoxyphenyl)methylamino]-5-propyl-4H-[1,2,4]-triazolo[1,5-a]pyrimidin-7-one | n.a. |
| 55 | | 2-[(4-propan-2-ylphenyl)methylamino]-5-propyl-4H-[1,2,4]-triazolo[1,5-a]pyrimidin-7-one | n.a. |

TABLE 1-continued

| Ex. | Structure | Systematic name | MS |
|---|---|---|---|
| 56 | | 2-[1-(4-phenylphenyl)ethyl-amino]-5-propyl-4H-[1,2,4]-triazolo[1,5-a]pyrimidin-7-one | 374.2 [M + H]+ |
| 57 | | 2-[[2-chloro-5-(1-methylpyrazol-3-yl)phenyl]methylamino]-5-propyl-4H-[1,2,4]triazolo[1,5-a]pyrimidin-7-one | 398.2 [M + H]+ |

Example 58

2-[(2,4-Dichlorophenyl)methylamino]-5-propyl-4H-[1,2,4]triazolo[1,5-a]pyrimidin-7-one

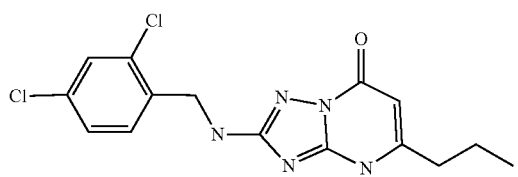

Step 1: 3-Cyano-1-[(2,4-dichlorophenyl)methyl]-2-methyl-isothiourea

A solution of N-cyanoimido-S,S-dimethyl-dithiocarbonate (200 mg, 1.4 mmol) and 2,4-dichlorobenzylamine (361.16 mg, 2.05 mmol) in ethanol (8 mL) was stirred at 80° C. for 2 hrs. A white precipitate formed. The mixture was cooled to 25° C. and filtered. The filter cake was washed with EtOH. The solid was dried in vacuum to give the title compound (360 mg, 91% yield) as a white solid. MS: 370.0 [M+H]+ ESI pos.

Step 2: N3-[(2,4-Dichlorophenyl)methyl]-1H-1,2,4-triazole-3,5-diamine

To a solution of 3-cyano-1-[(2,4-dichlorophenyl)methyl]-2-methyl-isothiourea (360 mg, 1.3 mmol) in ethanol (8 mL) was added hydrazine hydrate (0.2 mL, 4.12 mmol). The mixture was stirred at 80° C. for 6 hrs. Then, the mixture was concentrated to give the title compound (310 mg, 73%) as a white solid.

Step 3: 2-[(2,4-Dichlorophenyl)methylamino]-5-propyl-4H-[1,2,4]triazolo[1,5-a]pyrimidin-7-one 2,2,2-trifluoroacetic acid A solution of N3-[(2,4-dichlorophenyl)methyl]-1H-1,2,4-triazole-3,5-diamine (150.0 mg, 0.580 mmol) and methyl 3-oxohexanoate (100 mg, 0.7 mmol) in acetic acid (8 mL) was stirred at 120° C. for 5 hrs. Then, the mixture was concentrated and purified by prep-HPLC (TFA) to give title compound as a TFA salt (62 mg, 29%, white solid). MS: 352.2 [M+H]+ ESI pos.

In analogy to the procedures described in example 58, examples 59-78 (table 2) were prepared using suitable benzylamine and beta-ketoester starting materials and were obtained as trifluoroacetic acid salts.

TABLE 2

| Ex. | Structure | Systematic name | MS |
|---|---|---|---|
| 59 | | 5-cyclopropyl-2-[(2,4-dichloro-phenyl)methylamino]-4H-[1,2,4]triazolo[1,5-a]pyrimidin-7-one | 350.0 [M + H]+ |

TABLE 2-continued

| Ex. | Structure | Systematic name | MS |
|---|---|---|---|
| 60 | | 2-[(2,4-dichlorophenyl)methyl-amino]-5-(trifluoromethyl)-4H-[1,2,4]triazolo[1,5-a]-pyrimidin-7-one | 378.1 [M + H]+ |
| 61 | | 2-[(2,4-dichlorophenyl)methyl-amino]-5-isopropyl-4H-[1,2,4]-triazolo[1,5-a]pyrimidin-7-one | 352.1 [M + H]+ |
| 62 | | 2-[(4-chloro-2-fluorophenyl)-methylamino]-5-propyl-4H-[1,2,4]triazolo[1,5-a]pyrimidin-7-one | 336.1 [M + H]+ |
| 63 | | 5-(cyclopropylmethyl)-2-[(2,4-dichlorophenyl)methylamino]-4H-[1,2,4]triazolo[1,5-a]-pyrimidin-7-one | 364.1 [M + H]+ |
| 64 | | 2-[(2,4-dichlorophenyl)methyl-amino]-5-isobutyl-4H-[1,2,4]-triazolo[1,5-a]pyrimidin-7-one | 366.1 [M + H]+ |
| 65 | | 5-(cyclobutylmethyl)-2-[(2,4-dichlorophenyl)methylamino]-4H-[1,2,4]triazolo[1,5-a]pyrimidin-7-one | 378.1 [M + H]+ |
| 66 | | 2-[(4-chloro-2-methylphenyl)-methylamino]-5-propyl-4H-[1,2,4]triazolo[1,5-a]pyrimidin-7-one | 332.1 [M + H]+ |
| 67 | | 2-[(4-phenylphenyl)methyl-amino]-5-propyl-4H-[1,2,4]-triazolo[1,5-a]pyrimidin-7-one | 360.2 [M + H]+ |

TABLE 2-continued

| Ex. | Structure | Systematic name | MS |
| --- | --- | --- | --- |
| 68 | | 2-[(2,4-dichlorophenyl)methylamino]-5-(2,2,2-trifluoroethyl)-4H-[1,2,4]triazolo[1,5-a]pyrimidin-7-one | 392.0 [M + H]+ |
| 69 | | 2-[(2-chloro-4-methoxyphenyl)methylamino]-5-propyl-4H-[1,2,4]triazolo[1,5-a]pyrimidin-7-one | 348.1 [M + H]+ |
| 70 | | 2-[(4-methoxy-2-methylphenyl)methylamino]-5-propyl-4H-[1,2,4]triazolo[1,5-a]pyrimidin-7-one | 328.2 [M + H]+ |
| 71 | | 5-benzyl-2-[(2,4-dichlorophenyl)methylamino]-4H-[1,2,4]-triazolo[1,5-a]pyrimidin-7-one | 400.2 [M + H]+ |
| 72 | | 2-[(2,4-dichlorophenyl)methylamino]-5-(2-phenylethyl)-4H-[1,2,4]triazolo[1,5-a]-pyrimidin-7-one | 414.1 [M + H]+ |
| 73 | | 5-benzyl-2-[(4-isopropylphenyl)methylamino]-4H-[1,2,4]-triazolo[1,5-a]pyrimidin-7-one | 374.2 [M + H]+ |
| 74 | | 2-(1,3-benzoxazol-2-ylmethylamino)-5-propyl-4H-[1,2,4]-triazolo[1,5-a]pyrimidin-7-one | 325.3 [M + H]+ |
| 75 | | 2-[(4-phenylphenyl)methylamino]-5-(trifluoromethyl)-4H-[1,2,4]triazolo[1,5-a]pyrimidin-7-one | 386.1 [M + H]+ |

TABLE 2-continued

| Ex. | Structure | Systematic name | MS |
|---|---|---|---|
| 76 | | 2-[1-(2,4-dichlorophenyl)ethyl-amino]-5-propyl-4H-[1,2,4]-triazolo[1,5-a]pyrimidin-7-one | 366.3 [M + H]+ |
| 77 | | 2-[1-(2,4-dichlorophenyl)ethyl-amino]-5-(trifluoromethyl)-4H-[1,2,4]triazolo[1,5-a]pyrimidin-7-one | 392.2 [M + H]+ |
| 78 | | 2-[1-(4-phenylphenyl)ethyl-amino]-5-(trifluoromethyl)-4H-[1,2,4]triazolo[1,5-a]pyrimidin-7-one | 400.0 [M + H]+ |

Example 79

5-(Anilinomethyl)-2-[(2,4-dichlorophenyl)methyl-amino]-4H-[1,2,4]triazolo[1,5-a]pyrimidin-7-one

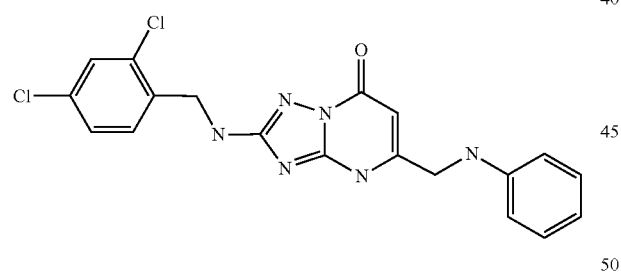

Step 1-3: 5-(Chloromethyl)-2-[(2,4-dichlorophenyl)methylamino]-4H-[1,2,4]triazolo[1,5-a]pyrimidin-7-one In analogy to the procedures described in example 52, using 2,4-dichlorobenzylamine in the first step and methyl 4-chloroacetoacetate in the third step, the title compound was prepared in three steps. Yellow solid. MS: 357.8 [M+H]+ ESI pos.

Step 4: 5-(Anilinomethyl)-2-[(2,4-dichlorophenyl)methylamino]-4H-[1,2,4]triazolo[1,5-a]pyrimidin-7-one To a solution of 5-(chloromethyl)-2-[(2,4-dichlorophenyl)methylamino]-4H-[1,2,4]triazolo[1,5-a]pyrimidin-7-one (300 mg, 0.84 mmol) and aminobenzene (0.23 mL, 2.5 mmol) in NMP (3 mL) was added DIEA (216 mg, 1.67 mmol), the mixture was stirred at 200° C. for 20 min in the microwave. The reaction was filtered and purified by Prep-HPLC (TFA) to get the crude product, which was triturated in EtOAc (5 mL) to get the title compound (50.5 mg, 13% yield) as light brown solid. MS: 415.1 [M+H]+ESI pos.

Example 80

2-[(2-Chlorophenyl)methylamino]-5-1(2-fluoroa-nilino)methyl1-4H-11,2,41triazolo[1,5-a]pyrimidin-7-one

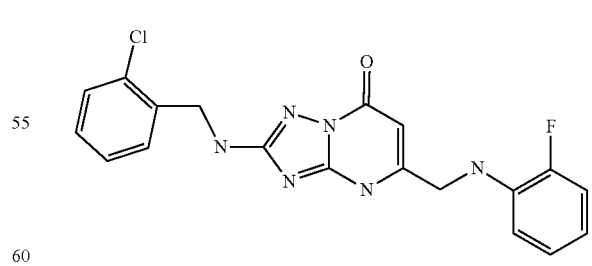

In analogy to the procedures described in example 77, the title compound was prepared using 2-chlorobenzylamine in the 1st step.

Example 81

2-[[5-(1-Methylpyrazol-3-yl)-2-(trifluoromethyl)phenyl]methylamino]-5-propyl-4H-[1,2,4]-triazolo[1,5-a]pyrimidin-7-one

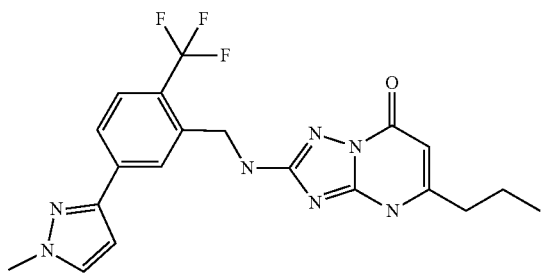

Step 1: 5-(1-Methylpyrazol-3-yl)-2-(trifluoromethyl)benzaldehyde

To a mixture of 5-bromo-2-(trifluoromethyl)benzaldehyde (300 mg, 1.2 mmo), 1-methyl-3-(4,4,5,5-tetramethyl-1,3,2-dioxaborolan-2-yl)-1H-pyrazole (290 mg, 1.4 mmol, 1.2 eq) in 1,4-dioxane (3 mL) and water (0.150 mL) was added sodium carbonate (284 mg, 2.68 mmol) and tetrakis(triphenylphosphine)palladium(0) (20.0 mg, 0.02 mmol). The mixture was stirred at 100° C. for 16 hrs. The mixture was cooled to room temperature, filtered and concentrated. The crude product was purified by chromatography on silica gel using a gradient of EtOAc/petroleum ether to provide the title compound (220 mg, 43% yield) as yellow solid.

Step 2: 2-[[5-(1-Methylpyrazol-3-yl)-2-(trifluoromethyl)phenyl]methylamino]-5-propyl-4H-[1,2,4]triazolo[1,5-a]pyrimidin-7-one In analogy to the procedures described in example 1, 5-(1-methylpyrazol-3-yl)-2-(trifluoromethyl) benzaldehyde was converted to the title compound. White solid. MS: 432.1 [M+H]+ ESI pos.

In analogy to the procedures described in example 81, examples 82-84 were prepared starting from from suitable bromobenzaldehyde starting materials (table 3).

TABLE 3

| Ex. | Structure | Systematic name | MS |
|---|---|---|---|
| 82 | | 2-[[4-(1-methylpyrazol-3-yl)-2-pyridyl]methylamino]-5-propyl-4H-[1,2,4]triazolo[1,5-a]pyrimidin-7-one | 365.2 [M + H]+ |
| 83 | | 2-[[2-methyl-5-(1-methylpyrazol-3-yl)phenyl]methylamino]-5-propyl-4H-[1,2,4]triazolo[1,5-a]pyrimidin-7-one | 378.4 [M + H]+ |
| 84 | | 4-(1-methylpyrazol-3-yl)-2-[[(7-oxo-5-propyl-4H-[1,2,4]triazolo[1,5-a]pyrimidin-2-yl)amino]methyl]benzonitrile | 389.2 [M + H]+ |

Example 85

2-[(2-Chloro-5-pyridazin-3-yl-phenyl)methylamino]-5-propyl-4H-[1,2,4]triazolo[1,5-a]pyrimidin-7-one

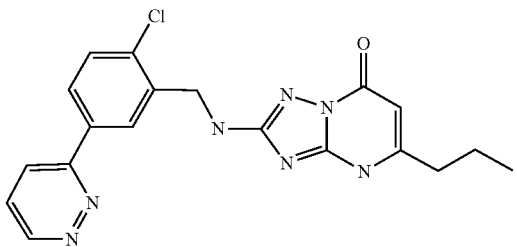

Step 1: (2-Chloro-5-pyridazin-3-yl-phenyl)methanol

To a solution of 3-bromopyridazine (0.21 mL, 2.23 mmol) and [2-chloro-5-(4,4,5,5-tetramethyl-1,3,2-dioxaborolan-2-yl)phenyl]methanol (717 mg, 2.68 mmol, 1.2 eq) in 1,4-dioxane (10 mL) was added potassium carbonate (926 mg, 6.7 mmol) and tetrakis(triphenylphosphine)palladium(0) (258 mg, 0.22 mmol). The mixture was purged with nitrogen and stirred at 100° C. for 12 hrs. The resulting solution was washed with water and extracted with ethyl acetate. The combined organic layers were washed with saturated aqueous NaCl, dried over anhydrous $Na_2SO_4$ and concentrated in vacuum. The crude product was purified by silica gel chromatography using a petroleum ether/ethyl acetate/dichloromethane gradient to obtain the title compound as a brown semisolid. MS: 221 [M+H]+

Step 2: 2-Chloro-5-pyridazin-3-yl-benzaldehyde

To a solution of (2-chloro-5-pyridazin-3-yl-phenyl)methanol (100 mg, 0.45 mmol) in dichloromethane (2.9 mL) and DMSO (0.73 mL) was added 2-iodoxybenzoic acid (190 mg, 0.68 mmol). The reaction mixture was stirred at 25° C. for 2 hrs. Saturated $Na_2SO_3$ and saturated $NaHCO_3$ were added and the aqueous phase was extracted with dichloromethane and washed with saturated brine. The combined organic layers were concentrated. The crude product was purified by silica gel chromatography using a petroleum ether/ethyl acetate gradient to gradient to provide the title compound (66 mg, 0.3 mmol) as a light-brown solid.

Step 3: 2-[(2-Chloro-5-pyridazin-3-yl-phenyl)methylamino]-5-propyl-4H-[1,2,4]triazolo[1,5-a]pyrimidin-7-one In analogy to the procedures described in example 1,2-chloro-5-pyridazin-3-yl-benzaldehyde was converted to the title compound. White solid. MS: 396 [M+H]+

Example 86

5-Butyl-2-[(2-chloro-5-pyrimidin-4-yl-phenyl)methylamino]-4H-[1,2,4]triazolo [1,5-a]pyrimidin-7-one

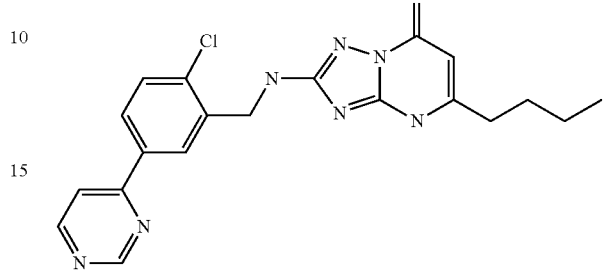

In analogy to the procedures described in example 85, the title compound was prepared in 3 steps. White powder. MS: 410.4 [M+H]+

Example 87

2-[[2-chloro-5-(5-methylimidazol-1-yl)phenyl]methylamino]-5-propyl-4H-[1,2,4]triazolo[1,5-a]pyrimidin-7-one

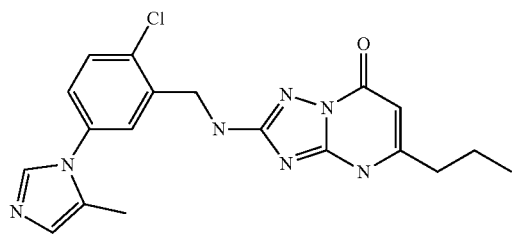

Step 1: 5-(4-Methylimidazol-1-yl)-2-nitro-benzoic acid/5-(5-methylimidazol-1-yl)-2-nitro-benzoic acid To a solution of 5-fluoro-2-nitrobenzoic acid (4.0 g, 21.6 mmol) and 4-methylimidazole (2.66 g, 32.4 mmol) in DMF (40 mL) was added potassium carbonate (5.97 g, 43.2 mmol) then the mixture was stirred at 100° C. for 12 hrs. The mixture was poured into water and washed with ethyl acetate. The aqueous layer was concentrated. The residue was dissolved in DMF (30 mL), filtered and concentrated to give title compounds (mixture of regioisomers, 6.6 g, 78%) as a yellow oil. MS: 248.0 [M+H]+

Step 2: 2-Amino-5-(4-methylimidazol-1-yl)benzoic acid/2-amino-5-(5-methylimidazol-1-yl)benzoic acid 5-(4-methylimidazol-1-yl)-2-nitro-benzoic acid/5-(5-methylimidazol-1-yl)-2-nitro-benzoic acid (6.5 g, 26.3 mmol) was dissolved in methanol (50 mL). Pd/C (300 mg, 26.3 mmol) was added. The mixture was stirred at 25° C. for 12 hrs under a hydrogen atmosphere. The reaction mixture was filtered and concentrated to give the title compound (7.0 g, 73% yield) as a yellow oil.

Step 3: 2-Chloro-5-(4-methylimidazol-1-yl)benzoic acid/2-chloro-5-(5-methylimidazol-1-yl)benzoic acid Cupric chloride (2.6 g, 19.3 mmol) and t-butyl nitrite (1.99 g, 19.3 mmol) were dissolved in MeCN (30 mL), 2-amino-5-(4-methylimidazol-1-yl)benzoic acid/2-amino-5-(5-methylimidazol-1-yl)benzoic acid (3.5 g, 16.1 mmol) was added. The mixture was stirred at 60° C. for 3 hrs, then concentrated. The crude product was dissolved in DMF (20 mL), filtered and concentrated to give the title compounds (mixture of isomers, 1.2 g, 29% yield) as a yellow solid. MS: 237.0 [M+H]+

Step 4: 2-Chloro-5-(4-methylimidazol-1-yl)phenyl]methanol and 2-chloro-5-(5-methylimidazol-1-yl)phenyl]-methanol A mixture of 2-chloro-5-(4-methylimidazol-1-yl)benzoic acid/2-chloro-5-(5-methylimidazol-1-yl)benzoic acid (500 mg, 2.1 mmol) was dissolved in THF (20 mL). The mixture was cooled to 0° C. Borane-dimethyl sulfide (0.21 mL, 2.1 mmol) was added. The mixture was stirred at 25° C. for 12 hrs, then MeOH (10 mL) was added to the mixture which was subsequently concentrated. The crude product was purified by silica gel chromatography using a petroleum ether/ethyl acetate gradient to provide 2-chloro-5-(5-methylimidazol-1-yl)phenyl]-methanol (120 mg, 23%) as a yellow oil and 2-chloro-5-(4-methylimidazol-1-yl)phenyl]methanol (500 mg, 70% purity, 75% yield) as a yellow oil. MS: 223.0 [M+H]+ for both regioisomers Step 5: 2-Chloro-5-(5-methylimidazol-1-yl)benzaldehyde

[2-Chloro-5-(5-methylimidazol-1-yl)phenyl]methanol (100 mg, 0.45 mmol) and 2-iodoxybenzoic acid (189 mg, 0.67 mmol,) were dissolved in dichlormethane (4 mL) and DMSO (1 mL). The mixture was stirred at 25° C. for 3 hrs. The mixture was treated with aqueous Na2SO3 solution and extracted with dichloromethane. The combined organic layers were dried with Na2SO4, filtered and concentrated. The crude product was purified by silica gel chromatography using a petroleum ether/ethyl acetate gradient to give the title compound (30 mg, 29%) as a yellow solid. MS: 221.0 [M+H]+

Step 6: 2-[[2-Chloro-5-(5-methylimidazol-1-yl)phenyl]methylamino]-5-propyl-4H-[1,2,4]triazolo[1,5-a]pyrimi-din-7-one In analogy to the procedures described in example 1,2-chloro-5-(5-methylimidazol-1-yl)benzaldehyde was converted to the title compound. White solid. MS: 398.2 [M+H]+

Example 88

2-[[2-Chloro-5-(4-methylimidazol-1-yl)phenyl]methylamino]-5-propyl-4H-[1,24]triazolo[1,5-a]pyrimidin-7-one

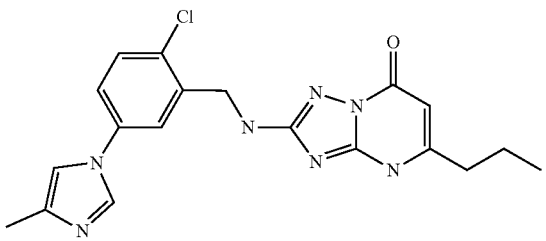

In analogy to steps 5 and 6 from example 87, 2-chloro-5-(4-methylimidazol-1-yl)phenyl]methanol was converted to the title compound. White solid. MS: 398.2 [M+H]+

Example 89

2-[[2-chloro-5-(thiazol-2-ylamino)phenyl]methyl-amino]-5-propyl-4H-[1,2,4]triazolo[1,5-a]pyrimidin-7-one

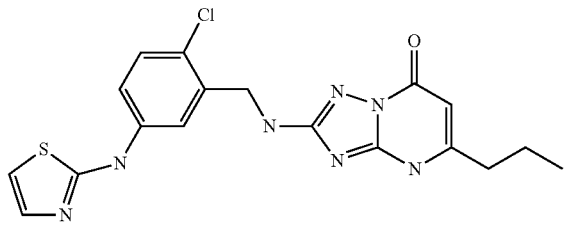

Step 1: [2-Chloro-5-(thiazol-2-ylamino)phenyl]methanol

To a solution of 2-aminothiazole (1.0 g, 9.99 mmol) and 5-bromo-2-chlorobenzyl alcohol (2.43 g, 11.0 mmol) in 1-butanol (20 mL) were added tris(dibenzylideneacetone)dipalladium(0) (183 mg, 0.20 mmol), brettphos (214 mg, 0.4 mmol) and potassium carbonate (2.76 g, 19.97 mmol). The mixture was purged with nitrogen and stirred at 100 ° C. for 12 hrs. The mixture was concentrated. The crude product was purified by silica gel chromatography using a petroleum ether/ethyl acetate gradient to provide the title compound (370 mg, 15%) as a yellow solid. MS: 241.0 [M+H]+

Step 2: 2-[[2-Chloro-5-(thiazol-2-ylamino)phenyl]methylamino]-5-propyl-4H-[1,2,4]triazolo[1,5-a]pyrimidin-7-one In analogy to the procedures described in example 85, steps 2 and 3,[2-chloro-5-(thiazol-2-ylamino)phenyl]methanol was converted into the title compound. White solid. MS: 416.0 [M+H]+

Example 90

N-[5-Chloro-4-[[(7-oxo-5-propyl-4H-[1,2,4]triazolo[1,5-a]pyrimidin-2-yl)amino]methyl]-2-pyridyl]isoxazole-3-carboxamide

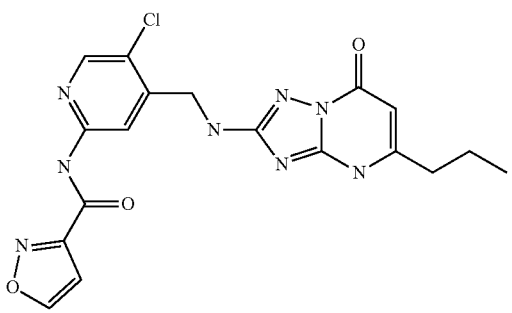

Step 1: Methyl 5-chloro-2-(isoxazole-3-carbonylamino)pyridine-4-carboxylate To a solution of methyl 2,5-dichloropyridine-4-carboxylate (1.1 g, 5.34 mmol), isoxazole-3-carboxamide (748 mg, 5.3 mmol), tris(dibenzylideneacetone)dipalladium (0) (244 mg, 0.27 mmol) and 5-diphenylphosphanyl-9,9-dimethylxanthen-4-yl)-diphenylphosphane (309 mg, 0.53 mmol) in 1,4-dioxane (15 mL) was added cesium carbonate (3.48 g, 10.7 mmol), then the mixture was stirred at 120° C. for 12 hrs. The mixture was concentrated. The crude product was purified by silica gel chromatography using a petroleum ether/ethyl acetate gradient to give the methyl 5-chloro-2-(isoxazole-3-carbonylamino)pyridine-4-carboxylate (300 mg, 10%) as a yellow solid. MS: 282.0 [M+H]+

Step 2: N-[5-Chloro-4-(hydroxymethyl)-2-pyridyl]isoxazole-3-carboxamide

To a solution of methyl 5-chloro-2-(isoxazole-3-carbonylamino)pyridine-4-carboxylate (400 mg, 1.4 mmol) in methanol (10 mL) and THF (3 mL) was added sodium borohydride (2.8 mL, 2.8 mmol). The reaction mixture was stirred at 30° C. for 4 hrs. Aqueous NaHCO3 (10mL) was poured into the mixture. After extraction with ethyl acetate, the combined organic layers were dried with Na2SO4, filtered and concentrated. The crude product was purified by silica gel chromatography to give the title compound (210 mg, 29%) as a yellow solid. MS: 254.0 [M+H]+

Step 3: N-(5-Chloro-4-formyl-2-pyridyl)isoxazole-3-carboxamide

In analogy to example 85, step 2, N-[5-chloro-4-(hydroxymethyl)-2-pyridyl]isoxazole-3-carboxamide was converted into the title compound. Yellow oil.

Step 4: N-[5-Chloro-4-[[(7-oxo-5-propyl-4H-[1,2,4]triazolo[1,5-a]pyrimidin-2-yl)amino]methyl]-2-pyridyl]-isoxazole-3-carboxamide To a solution of N-(5-chloro-4-formyl-2-pyridyl)isoxazole-3-carboxamide (90 mg, 0.29 mmol) and 2-amino-5-propyl-4H-[1,2,4]triazolo[1,5-a]pyrimidin-7-one (55 mg, 0.3 mmol) in THF (4 mL) were added diethyl-1,4-dihydro-2,6-dimethyl-3,5,pyridinedicarboxylate (72 mg, 0.3 mmol) and scandium(III) trifluoromethane-sulfonate (0.3 mg, 0.6 µmol). The reaction mixture was stirred at 30° C. for 12 hrs. The mixture was concentrated. The crude product was purified by prep-HPLC (basic) using an aqueous 0.05% ammonia hydroxide v/v)/acetontrile gradient and lyophilized to give the title compound (2.4 mg, 2% yield) as a white solid. MS: 451.3 [M+H]+

Example 91

2-[[2-Chloro-5-(1-methylpyrazol-4-yl)phenyl]methoxyl]-5-propyl-4H-[1,2,4]triazolo[1,5-a]pyrimidin-7-one

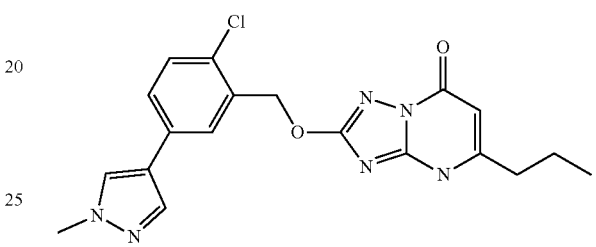

Step 1: [2-Chloro-5-(1-methylpyrazol-4-yl)phenyl]methanol

To a solution of 1-methyl-4-(4,4,5,5-tetramethyl-1,3,2-dioxaborolan-2-yl)-1H-pyrazole (4.5 g, 21.7 mmol), 5-bromo-2-chlorobenzyl alcohol (0.05 mL, 18.1 mmol), tetrakis(triphenylphosphine)palladium(0) (209 mg, 0.18 mmol) in 1,4-dioxane (30 mL) was added sodium carbonate (3.8 mg, 36.1 mmol), then the mixture was stirred at 100° C. for 16 hrs. The mixture was concentrated. The crude was purified by silica gel chromatography using a petroleum ether/ethyl acetate gradient to give the title compound (2.2 g, 47%) as a white solid. MS: 223.2 [M+H]+

Step 2: 2-Methylsulfanyl-5-propyl-4H-[1,2,4]triazolo[1,5-a]pyrimidin-7-one

3-Methylsulfanyl-1H-1,2,4-triazol-5-amine (5.0 g, 38.4 mmol) and methyl 3-oxohexanoate (11.1 g, 76.8 mmol) were dissolved in acetic acid (50 mL), then the mixture was stirred at 120° C. for 2 hrs. The mixture was concentrated. The crude product was triturated in EtOH and filtered. The solid was dried in vacuum to give the title compound (5.5 g, 53%) as a white solid. MS: 225.0 [M+H]+

Step 3: 2-Methylsulfonyl-5-propyl-4H-[1,2,4]triazolo[1,5-a]pyrimidin-7-one

2-Methylsulfanyl-5-propyl-4H-[1,2,4]triazolo[1,5-a]pyrimidin-7-one (2.0 g, 8.9 mmol) and 3-chloroperoxy-benzoic acid (6.2 g, 35.7 mmol) were dissolved in dichloromethane (30 mL), then the mixture was stirred at 25° C. for 16 hrs. Saturated aqueous Na2SO3 solution and saturated NaHCO3 solution were poured into the mixture. A white solid precipitated out. The solid was filtered and dried in vacuum to provide the title compound (1.3 g, 54%) as a white solid. MS: 257.0 [M+H]+

Step 4: 2-1[2-Chloro-5-(1-methylpyrazol-4-yl)phe-
nyl]methoxyl-5-propyl-4H-[1,2,4]triazolo[1,5-a]
pyrimidin-7-one The 2-methylsulfonyl-5-propyl-4H-[1,2,4]triazolo[1,5-a]pyrimidin-7-one (300 mg, 1.2 mmol) was dissolved in DMF (10 mL), then [2-chloro-5-(1-methylpyrazol-4-yl)phenyl]methanol (287 mg, 1.3 mmol) was added to the mixture. The mixture was stirred at 100° C. for 12 hrs. The mixture was poured into water and extracted with ethyl acetate. The organic layer was dried with Na$_2$SO$_4$, filtered and concentrated. The crude product was purified using a water (0.225% formic acid)/acetonitrile gradient and lyophilized to give the title compound (367 mg, 8%) as a white solid. MS: 399.1 [M+H]$^+$ Example 92

2-1(2-Chloro-4-phenyl-phenyl)methoxyl-5-propyl-
4H-[1,2,4]triazolo[1,5-a]pyrimidin-7-one

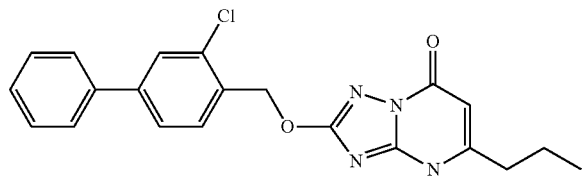

In analogy to the procedures described in example 91, the title compound was prepared from the suitable benzyl alcohol. White solid. 395.1 [M+H]$^+$ Example 93

2-[[5-Chloro-2-(3-methoxyazetidin-1-yl)-4-pyridyl]
methylamino]-5-propyl-4H-[1,2,4]triazolo[1,5-a]
pyrimidin-7-one

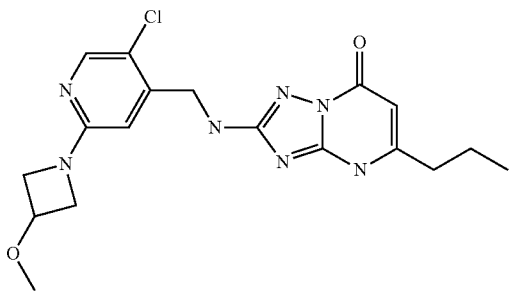

Step 1: [5-Chloro-2-(3-methoxyazetidin-1-yl)-4-
pyridyl]methanol

To a solution of (2,5-dichloro-4-pyridyl)methanol (400 mg, 2.3 mmol) and potassium carbonate (932 mg, 6.7 mmol) in NMP (9.8 mL) was added 3-methoxyazetidine (196 mg, 2.3 mmol). The reaction mixture was stirred at 130° C. for 12 hrs. The reaction mixture was concentrated. The crude product was purified by silica gel chromatography using a petroleum ether/ethyl acetate gradient to give the title compound (100 mg, 0.44 mmol, 19%) as a light yellow oil.

Step 2: 5-Chloro-2-(3-methoxyazetidin-1-yl)pyridine-4-carbaldehyde

To a solution of 2-iodoxybenzoic acid (184 mg, 0.66 mmol) in DCM (4 mL) was added [5-chloro-2-(3-methoxyazetidin-1-yl)-4-pyridyl]methanol (100.0 mg, 0.440 mmol, 1 eq). The reaction mixture was stirred at 25° C. for 2 hrs. The reaction mixture was quenched with Na$_2$SO$_3$ (5 mL) and NaHCO$_3$ (5 mL), then extracted with dichloromethane, dried over Na$_2$SO$_4$ and filtered. The filtrate was concentrated. The crude product was purified by prep-TLC using petroleum ether/ethyl acetate 3:1 as eluent to provide the title compound (75 mg, 76%) as a yellow oil.

Step 3: 2-[[2-Chloro-5-(1-methylpyrazol-4-yl)phe-
nyl]methoxy]-5-propyl-4H-[1,2,4]triazolo[1,5-a]
pyrimidin-7-one In analogy to the procedure described in example 90, step 4, the title compound was prepared from 5-chloro-2-(3-methoxyazetidin-1-yl)pyridine-4-carbaldehyde. Light yellow solid. MS: 404.5 [M+H]$^+$ In analogy to the procedures describe in example 93, examples 94 and 95 were prepared using the appropriate amines in the first step (table 4).

TABLE 4

| Ex. | Structure | Systematic name | MS |
|---|---|---|---|
| 94 | ![structure] | 2-[[5-chloro-2-(1-piperidyl)-4-pyridyl]methylamino]-5-propyl-4H-[1,2,4]triazolo[1,5-a]pyrimidin-7-one | 402.2 [M + H]+ |

TABLE 4-continued

| Ex. | Structure | Systematic name | MS |
|---|---|---|---|
| 95 | 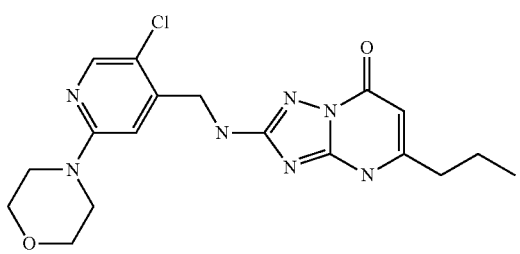 | 2-[[5-chloro-2-(4-methyl-piperazin-1-yl)-4-pyridyl]-methylamino]-5-propyl-4H-[1,2,4]triazolo[1,5-a]pyrimidin-7-one | 417.4 [M + H]+ |

Example 96

2-[(5-Chloro-2-morpholino-4-pyridyl)methylamino]-5-propyl-4H-[1,2,4]triazolo[1,5-a]pyrimidin-7-one Example 97

5-Butyl-2-[[5-chloro-2-(2-oxa-6-azaspiro[3.3]heptan-6-yl)-4-pyridyl]methylamino]-4H-[1,2,4]triazolo[1,5-a]pyrimidin-7-one

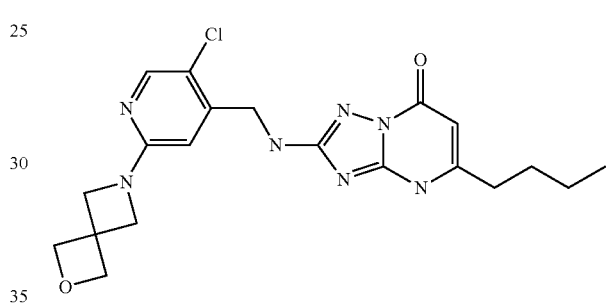

Step 1:
5-Chloro-2-morphohno-pyridine-4-carboxylic acid

A mixture of 2,5-dichloroisonicotinic acid (1.0 g, 5.2 mmol) and morpholine (6.85 g, 78.7 mmol) in DMA (3 mL) was stirred at 80° C. for 96 hrs. The reaction mixture was concentrated. The residue was acidified to pH 1.5 with aqueous HCl and extracted with dichloromethane. The organic extracts were combined, and the solvents removed under vacuum to obtain the title compound (1.55 g, quantitative) as brown solid. MS: 243.6 [M+H]+

Step 2: (5-Chloro-2-morpholino-4-pyridyl)methanol

To a solution of 5-chloro-2-morpholino-pyridine-4-carboxylic acid (1.5 g, 6.18 mmol) in THF (20 mL) was added BH$_3$·Me$_2$S (1.55 mL, 15.45 mmol) dropwise in an ice-bath, then the mixture was stirred at 30° C. for 12 hrs. 3 mL of MeOH was added to quench the reaction mixture, then the mixture was concentrated and extracted with EtOAc. The concentrated organic layer was purified by silica gel chromatography using a petroleum ether/ethyl acetate gradient to give (5-chloro-2-morpholino-4-pyridyl)methanol (690 mg, 3.0 mmol, 50%) as white solid. MS: 229.1 [M+H]+

Step 3: 2-[(5-Chloro-2-morpholino-4-pyridyl)methylamino]-5-propyl-4H-[1,2,4]triazolo[1,5-a]pyrimidin-7-one In analogy to the procedure described in example 90, steps 3 and 4, (5-chloro-2-morpholino-4-pyridyl)methanol was converted into the title compound. Light yellow solid. MS: 404.3 [M+H]+

In analogy to the procedures described in example 96, example 97 was prepared starting from methyl 2,5-dichloropyridine-4-carboxylate and 2-oxa-6-azaspiro[3.3]heptane and using lithium borohydride as reductant in the second step. White solid. MS: 430.2 [M+H]+

Example 98

5-Butyl-2-[(5-chloro-2-morpholino-pyrimidin-4-yl)methylamino]-4H-[1,2,4]triazolo[1,5-a]pyrimidin-7-one

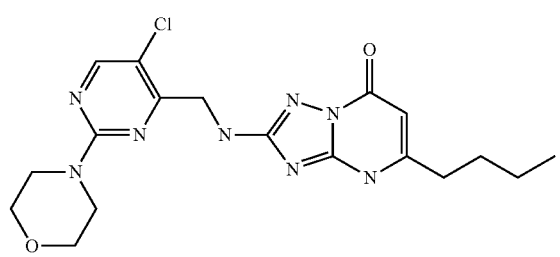

Step 1: Methyl 2-morpholinopyrimidine-4-carboxylate

A solution of methyl 2-chloropyrimidine-4-carboxylate (1.0 g, 5.8 mmol), morpholine (505 mg, 5.8 mmol) and potassium carbonate (1.2 g, 8.7 mmol) in DMF (20 mL) was stirred at 25° C. for 15 hrs. The mixture was diluted with water and extracted with ethyl acetate. The combined organic layers were washed with brine, dried over $Na_2SO_4$, filtered and concentrated. The residue was purified by silica gel chromatography using a petroleum ether/ethyl acetate gradient to afford methyl 2-morpholinopyrimidine-4-carboxylate (460 mg, 36%) as a white solid.

Step 2: (2-Morpholinopyrimidin-4-yl)methanol

To a solution of methyl 2-morpholinopyrimidine-4-carboxylate (360 mg, 1.61 mmol) in THF (5 mL) was added lithium borohydride (70 mg, 3.2 mmol). The reaction was stirred at 25° C. for 15 hrs. The reaction mixture was concentrated. The crude product was purified by prep-HPLC to afford the title compound (300 mg, 95%) as a light yellow oil.

Step 3: (5-Chloro-2-morpholino-pyrimidin-4-yl)methanol

A solution of (2-morpholinopyrimidin-4-yl)methanol (300 mg, 1.54 mmol) and N-chlorosuccinimide (226 mg, 1.7 mmol) in THF (15 mL) was stirred at 20° C. for 15 hrs. The mixture was diluted with water and extracted with ethyl acetate. The combined organic layers were washed with brine, dried over $Na_2SO_4$, filtered and concentrated. The crude product was purified by prep-HPLC to afford the title compound (240 mg, 68%) as a yellow solid.

Step 4: 5-Butyl-2-[(5-chloro-2-morpholino-pyrimidin-4-yl)methylamino]-4H-[1,2,4]triazolo[1,5-a]pyrimidin-7-one In analogy to the procedure described in example 90, steps 3 and 4, (5-chloro-2-morpholino-pyrimidin-4-yl)methanol was converted into the title compound. White solid. MS: 419.2 [M+H]+

Example 99

2-[(4-Chloro-6-morpholino-3-pyridyl)methylamino]-5-propyl-4H-[1,2,4]triazolo[1,5-a]pyrimidin-7-one

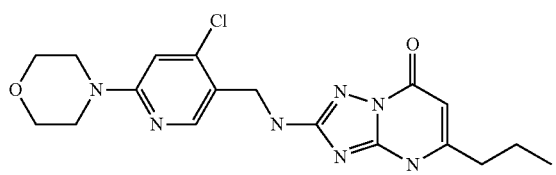

Step 1: 4-(4-Chloro-2-pyridyl)morpholine

To a mixture of 4-chloro-2-fluoropyridine (2.0 g, 15.2 mmol) and morpholine (1.6 g, 18.3 mmol) in DMF (400 mL) was added N,N-diisopropylethylamine (5.3 mL, 30.4 mmol), then the mixture was stirred at 80° C. for 12 hrs. The mixture was concentrated. The residue was extracted with EtOAc. The combined organic layers were concentrated and purified by silica gel chromatography using a petroleum ether/ethyl acetate gradient to provide the title compound (2 g, 66%) as a white solid. MS: 199.2 [M+H]+

Step 2: 4-(4-Chloro-5-iodo-2-pyridyl)morpholine

To a solution of 4-(4-chloro-2-pyridyl)morpholine (1.0 g, 5.03 mmol) in acetonitrile (14 mL) was added N-iodosuccinimide (1.25 g, 5.54 mmol) at 0° C., then the mixture was stirred at 60° C. for 12 hrs. The mixture was concentrated to remove the solvent. The residue was extracted with EtOAc. The combined organic layers were concentrated. The crude product was purified by prep. HPLC to give the title compound (780 mg, 46%) as a light grey solid. MS: 325.1 [M+H]+

Step 3: 4-(4-Chloro-5-vinyl-2-pyridyl)morpholine

To a solution of 4-(4-chloro-5-iodo-2-pyridyl)morpholine (600 mg, 1.85 mmol) and potassium trimethyl(vinyl)boranium (451 mg, 3.7 mmol) in ethanol (10 mL) were added triethylamine (0.52 mL, 3.7 mmol) and Pd(dppf)Cl$_2$ (75 mg, 0.09 mmol), then the mixture was degassed and stirred at 80° C. for 20 hrs under a N$_2$ atmosphere. The mixture was concentrated to remove the solvent and extracted. The combined organic layers were purified by silica gel chromatography using a petroleum ether/ethyl acetate gradient to give the title compound (360 mg, 84%) as a light yellow solid. 225.1 [M+H]+

Step 4: 4-Chloro-6-morpholino-pyridine-3-carbaldehyde

To a solution of 4-(4-chloro-5-vinyl-2-pyridyl)morpholine (200 mg, 0.89 mmol) in 1,4-dioxane (1.5 mL) and water (1 mL) was added sodium periodate (476 mg, 2.23 mmol), followed by potassium osmium dihydrate (3.3 mg, 0.01 mmol). Then the mixture was stirred at 25° C. for 2 hrs. The suspension was filtered, and the filtrate was concentrated. The crude product was purified by prep-HPLC to give the title compound (30 mg, 15%) as a white solid.

Step 5: 2-[(4-Chloro-6-morpholino-3-pyridyl)methylamino]-5-propyl-4H-[1,2,4]triazolo[1,5-a]pyrimidin-7-one In analogy to the procedure described in example 90, steps 4,4-chloro-6-morpholino-pyridine-3-carbaldehyde was converted into the title compound. White solid. MS: 404.2 [M+H]+

Example 100

2-[[(4-Chloro-6-(4-methylpiperazin-1-yl)-3-pyridyl]methylamino]-5-propyl-4H-[1,2,4]triazolo[1,5-a]pyrimidin-7-one

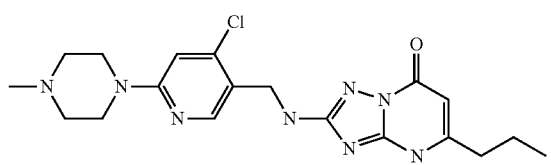

Step 1: 1-(4-Chloro-2-pyridyl)-4-methyl-piperazine

To a solution of N,N-diisopropylethylamine (5.3 mL, 30.4 mmol) and 4-chloro-2-fluoropyridine (2.0 g, 15.2 mmol) in DMF (50 mL), 1-methylpiperazine (1.5 g, 15.2 mmol) was added. The reaction mixture was stirred at 80° C. for 12 hrs. The reaction mixture was concentrated. The crude product was purified by prep-HPLC to provide the title compound (1.3 g, 40%) as a colorless oil.

Step 2: 1-(5-Bromo-4-chloro-2-pyridyl)-4-methyl-piperazine

To a solution of 1-(4-chloro-2-pyridyl)-4-methyl-piperazine (1.3 mg, 6.14 mmol) in acetonitrile (20 mL), was added N-bromosuccinimed (1.2 g, 6.7 mmol). The reaction mixture was stirred at 50° C. for 12 hrs. The reaction mixture was concentrated. The crude product was purified by prep-HPLC to give the title compound (1.2 g, 67%) as a light yellow oil.

Step 3: 1-(4-Chloro-5-vinyl-2-pyridyl)-4-methyl-piperazine

To a solution of [1,1-bis(diphenylphosphino)ferrocene]dichloropalladium(II) (140 mg, 0.17 mmol) in ethanol (20 mL) was added 1-(5-bromo-4-chloro-2-pyridyl)-4-methyl-piperazine (1.0 g, 3.44 mmol), then the mixture was cooled to −30° C. and stirred for 10 minutes. Then triethylamine (0.96 mL, 6.9 mmol) was added dropwise. The reaction mixture was stirred at 80° C. for 16 hrs. The reaction mixture was concentrated. The crude product was purified by silica gel chromatography using a petroleum ether/ethyl acetate gradient to give the title compound (700 mg, 43%) as a dark brown oil.

Step 4: 4-Chloro-6-(4-methylpiperazin-1-yl)-1-oxido-pyridin-1-ium-3-carbaldehyde A solution of 1-(4-chloro-5-vinyl-2-pyridyl)-4-methyl-piperazine (100 mg, 0.21 mmol) in methanol (2 mL) and dichloromethane (2 mL) was cooled to −78° C. The solution was saturated with ozone and a stream ozone was bubbled through for 10 minutes while stirring. The reaction mixture was warmed to ambient temperature and quenched with excess dimethylsulfide. The crude product was purified by prep-TLC (dichloromethane/MeOH 8:1) to provide the title compound (30 mg, 0.12 mmol, 28%) as a light brown oil.

Step 5: 2-[[4-Chloro-6-(4-methylpiperazin-1-yl)-3-pyridyl]methylamino]-5-propyl-4H-[1,2,4]triazolo[1,5-a]pyrimidin-7-one To a solution of 4-chloro-6-(4-methylpiperazin-1-yl)-1-oxido-pyridin-1-ium-3-carbaldehyde (30 mg, 0.06 mmol) and 2-amino-5-propyl-4H-[1,2,4]triazolo[1,5-a]pyrimidin-7-one (11.3 mg, 0.06 mmol) in THF (5 mL) were added scandium(III) trifluoromethanesulfonate (0.06 mg) and diethyl 1,4-dihydro-2,6-dimethyl-3,5-pyridinedicarboxylate (14.9 mg, 0.06 mmol). The reaction mixture was stirred at 20° C. for 14 hrs. Then the bis(pinacolato)diboron (14.9 mg, 0.06 mmol) was added . The reaction mixture was stirred at 25° C. for 2 hrs. The reaction mixture was concentrated. The crude product was purified by prep-HPLC to give the title compound (1 mg, 4%) as a light yellow solid. 416.9 [M+H]+

Example 101

2-[(2,4-Dichlorophenyl)methylamino]-5-(2-phenyl-ethyl)-4H-[1,2,4]triazolo[1,5-a][1,3,5]-triazin-7-one

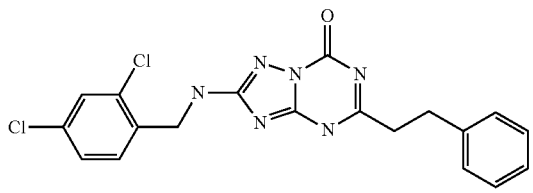

Step 1: Ethyl 3-phenylpropanimidate

To a solution of 3-phenylpropionitrile (2.0 g, 15.25 mmol) in ethanol (4 mL) was added HCl/dioxane (8.7 mL, 122 mmol) while the temperature was kept at 0° C. The mixture was stirred at 0° C. for 3 hrs. The reaction was concentrated in vacuum to a white residue, which was re-dissolved in ethyl acetate. The organic layer was washed with saturated $K_2CO_3$ solution, dried over sodium sulfate and concentrated to provide the title compound (2.0 g, 61%) as white solid.

Step 2: Ethyl (1Z)-3-phenyl-N-(1,2,4-triazole-1-carbonyl)propanimidate

To a solution of ethyl 3-phenylpropanimidate (2.0 g, 11.3 mmol) in dichloromethane (20 mL) was added 1,1'-carbonyl-di(1,2,4-triazole) (1.85 g, 11.3 mmol) while the temperature was kept at 5° C. The mixture was stirred at 20° C. for 12 hrs. The reaction was washed with water, dried over sodium sulfate and concentrated to provide the title compound (3.0 g, 98%) as colorless oil.

Step 3: 2-Amino-5-(2-phenylethyl)-6H-[1,2,4]triazolo[1,5-a][1,3,5]triazin-7-one To a solution of ethyl (1Z)-3-phenyl-N-(1,2,4-triazole-1-carbonyl)propanimidate (1.8 g, 6.61 mmol) in methanol (20 mL) was added 3,5-diamino-1,2,4-triazole (655 mg, 6.61 mmol) while the temperature was kept at 5° C. The mixture was stirred at 80° C. for 12 hrs. The reaction was concentrated. The residue was triturated with MeOH (3 mL) to provide the title compound (600 mg, 33%) as white solid. MS: 257.6 [M+H]+

Step 4: 2-[(2,4-Dichlorophenyl)methylamino]-5-(2-phenylethyl)-4H-[1,2,4]triazolo[1,5-a][1,3,5]triazin-7-one In analogy to the procedures described in example 1,2-amino-5-(2-phenylethyl)-6H-[1,2,4]triazolo[1,5-a][1,3,5]triazin-7-one was converted to the title compound. White solid. MS: 414.9 [M+H]+

Example 102 cGAS Activity Assay—Malachite Green

Compounds were tested for cGAS inhibition in a coupled enzymatic assay based on Phosphate detection by Malachite Green. Final assay conditions were 20 mM TRIS pH 7.5 (Applichem), 5 mM $MgCl_2$ (Sigma) and 0.01% BSA (Sigma) supplemented with 80 μM ATP (Sigma), 80 μM GTP (Sigma) and 100 nM Interferon Stimulating DNA (ISD) (Microsynth). Recombinantly expressed purified human cGAS (residues 161-522) was used at 25 nM.

All compounds were prepared as 10 mM stock solutions in DMSO and a 16 pt dilution series in DMSO with a dilution factor of 2.5 was prepared. 1 μL of DMSO dilution series was transferred to 32.3 μL reaction buffer, mixed by pipetting up/down, spun for 1 minute at 3000 rpm and was visually inspected for precipitation. 5 μL of 3-fold enzyme stock solution were transferred to an empty 384-well Black/Clear Flat Bottom Polystyrene NBS (Corning) rows 3-24. Rows 1-2 were filled with assay buffer. Plates were spun 10 seconds at 1000 rpm (164×g). 5 μL of compound intermediate dilution was added and mixed by pipetting up/down to rows 3-24. Rows 1-2 were filled with 3.1% DMSO assay buffer. Plates were spun 10 seconds at 1000 rpm (164×g). 5 μL 3-fold Nucleotide/DNA mix was added to all wells to start the reaction. Plates were spun 10 seconds at 1000 rpm (164×g) and incubated for 4 hour at room temperature (RT) in the dark. 5 μL 4 U/mL PPase (Sigma) were added to all wells. Plates spun 10 seconds at 1000 rpm (164×g). 10 μL BioMol green Solution (Enzo Life Sciences) was added to all wells. Plates spun 10 seconds at 1000 rpm (164×g) and incubated 30 minutes at RT in the dark. Absorbance data was collected 620 nm on an EnVision Multilable Reader (Perkin Elmer) and the following measurement settings were used: excitation filter photometric was 620 nm; excitation from the top; measurement height was 1 mm; number of flashes was 30; number of flashes integrated was 1.

All plates are checked for abnormalities and outliers in the Blank Control (no protein, row 1) and the Neutral Control (no compound, row 2) are excluded using the 3*SD rule. Data was normalized to 0 and 100% by Blank and Neutral Control and each curve was fitted and judged using the 4 parameter logistic equation to determine the IC50 for cGAS inhibition.

The results of this assay are provided in Table 5. Table 5 provides IC50 values (μM) for cGAS inhibition obtained for particular examples of the present invention as measured by the above-described assay.

| Example | IC50 cGAS (μM) |
| --- | --- |
| 1 | 0.744 |
| 2 | 4.384 |
| 3 | 1.567 |
| 4 | 0.765 |
| 5 | 4.010 |
| 6 | 2.906 |
| 7 | 2.417 |
| 8 | 7.784 |
| 9 | 4.014 |
| 10 | 4.079 |
| 11 | 1.336 |
| 12 | 0.602 |
| 13 | 1.944 |
| 14 | 4.923 |
| 15 | 3.996 |
| 16 | 2.562 |
| 17 | 4.081 |
| 18 | 2.824 |
| 19 | 0.663 |
| 20 | 1.235 |
| 21 | 0.744 |
| 22 | 3.004 |
| 23 | 2.438 |
| 24 | 0.401 |
| 25 | 0.287 |
| 26 | 1.600 |
| 27 | 0.178 |
| 28 | 1.911 |
| 29 | 0.668 |
| 30 | 0.444 |
| 31 | 0.078 |
| 32 | 0.162 |
| 33 | 0.816 |
| 34 | 2.107 |
| 35 | 1.322 |
| 36 | 0.392 |
| 37 | 5.164 |
| 38 | 0.277 |
| 39 | 1.042 |
| 40 | 0.869 |
| 41 | 0.701 |
| 42 | 2.132 |
| 43 | 0.326 |
| 44 | 6.565 |
| 45 | 3.525 |
| 46 | 0.805 |
| 47 | 2.012 |
| 48 | 0.603 |
| 49 | 4.662 |
| 50 | 0.263 |
| 51 | 0.491 |
| 52 | 3.285 |
| 53 | 2.664 |
| 54 | 2.204 |
| 55 | 1.590 |
| 56 | 2.869 |
| 57 | 0.533 |
| 58 | 1.721 |
| 59 | 3.785 |
| 60 | 1.253 |
| 61 | 2.736 |
| 62 | 4.041 |
| 63 | 3.588 |
| 64 | 3.330 |
| 65 | 1.589 |
| 66 | 9.281 |
| 67 | 0.672 |
| 68 | 4.443 |
| 69 | 9.513 |
| 70 | 3.638 |
| 71 | 1.762 |
| 72 | 2.112 |
| 73 | 2.699 |
| 74 | 4.559 |
| 75 | 0.827 |
| 76 | 6.723 |
| 77 | 8.407 |
| 78 | 2.447 |
| 79 | 4.615 |
| 80 | 1.918 |
| 81 | 1.694 |
| 82 | 1.486 |
| 83 | 1.235 |
| 84 | 1.152 |
| 85 | 2.773 |
| 86 | 0.079 |
| 87 | 0.640 |
| 88 | 0.484 |
| 89 | 0.492 |
| 90 | 0.807 |
| 91 | 2.905 |
| 92 | 2.178 |
| 93 | 0.650 |
| 94 | 2.546 |
| 95 | 6.671 |
| 96 | 1.155 |
| 97 | 0.128 |
| 98 | 0.435 |
| 99 | 2.192 |
| 100 | 5.217 |
| 101 | 7.794 |

Example A

Film coated tablets containing the following ingredients can be manufactured in a conventional manner:

| Ingredients | Per tablet | |
|---|---|---|
| Kernel: | | |
| Compound of formula (I) | 10.0 mg | 200.0 mg |
| Microcrystalline cellulose | 23.5 mg | 43.5 mg |
| Lactose hydrous | 60.0 mg | 70.0 mg |
| Povidone K30 | 12.5 mg | 15.0 mg |
| Sodium starch glycolate | 12.5 mg | 17.0 mg |
| Magnesium stearate | 1.5 mg | 4.5 mg |
| (Kernel Weight) | 120.0 mg | 350.0 mg |
| Film Coat: | | |
| Hydroxypropyl methyl cellulose | 3.5 mg | 7.0 mg |
| Polyethylene glycol 6000 | 0.8 mg | 1.6 mg |
| Talc | 1.3 mg | 2.6 mg |
| Iron oxide (yellow) | 0.8 mg | 1.6 mg |
| Titan dioxide | 0.8 mg | 1.6 mg |

The active ingredient is sieved and mixed with microcrystalline cellulose and the mixture is granulated with a solution of polyvinylpyrrolidone in water. The granulate is then mixed with sodium starch glycolate and magnesium stearate and compressed to yield kernels of 120 or 350 mg respectively. The kernels are lacquered with an aq. solution/suspension of the above mentioned film coat.

Example B

Capsules containing the following ingredients can be manufactured in a conventional manner:

| Ingredients | Per capsule |
|---|---|
| Compound of formula (I) | 25.0 mg |
| Lactose | 150.0 mg |
| Maize starch | 20.0 mg |
| Talc | 5.0 mg |

The components are sieved and mixed and filled into capsules of size 2.

Example C

Injection solutions can have the following composition:

| Compound of formula (I) | 3.0 mg |
|---|---|
| Polyethylene glycol 400 | 150.0 mg |
| Acetic acid | q.s. ad pH 5.0 |
| Water for injection solutions | ad 1.0 ml |

The active ingredient is dissolved in a mixture of Polyethylene glycol 400 and water for injection (part). The pH is adjusted to 5.0 by addition of acetic acid. The volume is adjusted to 1.0 ml by addition of the residual amount of water. The solution is filtered, filled into vials using an appropriate overage and sterilized.

The invention claimed is:
1. The invention relates in particular to a compound of formula (I)

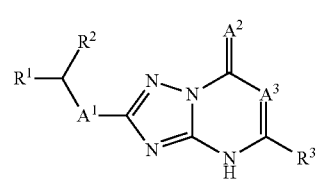

wherein:
R$^1$ is alkylpiperazinyl(halopyridinyl), morpholino(halopyridinyl), morpholino(halopyrimidinyl), 2-oxa-6-azaspiro[3.3]heptanyl(halopyridinyl), pyrimidinyl(halophenyl), alkylpyrazolyl(halophenyl), ortho-para-dichlorophenyl, ortho-fluoro-para-chlorophenyl, cycloalkylisoxazolyl, phenylpyrazolyl, phenylisoxazolyl, pyrazinylpyrazolyl, alkylpiperazinyl(halopyridinyl), phenyl(alkylpyrazolyl), piperidyl(halopyridinyl), alkylimidazolyl(halophenyl), morpholinophenyl, morpholino(halophenyl), morpholino(halopyridinyl), alkoxyazetidinyl(halopyridinyl), halobiphenyl, pyridinyl(halophenyl), isoxazolylcarbonylamino(halopyridinyl), alkylpyrazolyl(cyanophenyl), pyridazinyl(halophenyl), biphenyl, thiazolylamino(halophenyl), alkylpyrazolyl(alkoxyphenyl), alkylpyrazolyl(alkylphenyl), alkylpyrazolyl(pyridinyl), alkylpyrazolyl(haloalkylphenyl), quinolyl, biphenyl alkylpyrazolylphenyl, phenylalkyloxy(halophenyl), alkoxy(halophenyl), cycloalkyloxyphenyl, imidazolylphenyl, haloalkyloxyphenyl, cyano(halophenyl), pyrazolylphenyl, benzoxazol, iso-propylphenyl, alkoxy(alkylphenyl), pyrimidinylphenyl, halo(alkylphenyl) or (para-ethyloxy)phenyl;
R$^2$ is hydrogen or methyl;
R$^3$ is alkyl, cycloalkyl, alkoxyalkyl, difluoroalkyl, trifluoroalkyl, phenylalkyl, phenylaminoalkyl or cycloalkylalkyl;
A$^1$ is —NH— or oxygen;
A$^2$ is oxygen or sulfur; and
A$^3$ is —CH— or nitrogen;
or a pharmaceutically acceptable salt or tautomer thereof;
provided that
[1,2,4]Triazolo[1,5-a]pyrimidin-7(1H)-one, 2-[[(2,4-dichlorophenyl)methyl]amino]-5-propyl;
[1,2,4]Triazolo[1,5-a]pyrimidin-7(1H)-one, 5-ethyl-2-[[[4-(1-methylethyl)phenyl]methyl]amino];
[1,2,4]Triazolo[1,5-a]pyrimidin-7(1H)-one, 2-[[(2,4-dichlorophenyl)methyl]amino]-5-methyl;
[1,2,4]Triazolo[1,5-a]pyrimidin-7(1H)-one, 2-[[(4-ethoxyphenyl)methyl]amino]-5-(1-methylethyl);
[1,2,4]Triazolo[1,5-a]pyrimidin-7(1H)-one, 2-[[[4-(1-methylethyl)phenyl]methyl]amino]-5-[(phenylamino)methyl];
[1,2,4]Triazolo[1,5-a]pyrimidin-7(1H)-one, 2-[[[4-(1-methylethyl)phenyl]methyl]amino]-5-propyl;
[1,2,4]Triazolo[1,5-a]pyrimidin-7(1H)-one, 2-[[(4-ethoxyphenyl)methyl]amino]-5-[(phenylamino)methyl];
[1,2,4]Triazolo[1,5-a]pyrimidin-7(1H)-one, 5-methyl-2-[[[4-(1-methylethyl)phenyl]methyl]amino];
[1,2,4]Triazolo[1,5-a]pyrimidin-7(1H)-one, 2-[[(4-ethoxyphenyl)methyl]amino]-5-methyl;

[1,2,4]Triazolo[1,5-a]pyrimidin-7(1H)-one, 2-[[(4-ethoxyphenyl)methyl]amino]-5-propyl; and
[1,2,4]Triazolo[1,5-a]pyrimidin-7(1H)-one, 2-[[(4-ethoxyphenyl)methyl]amino]-5-ethyl;
are excluded.

2. A compound according to claim 1, wherein $R^1$ is 2-oxa-6-azaspiro[3.3]heptanyl(halopyridinyl), pyrimidinyl(halophenyl), alkylpyrazolyl(halophenyl) or pyridinyl(halophenyl).

3. A compound according to claim 1, wherein $R^1$ is 2-oxa-6-azaspiro[3.3]heptanyl(chloropyridinyl), pyrimidinyl(chlorophenyl), methylpyrazolyl(chlorophenyl) or pyridinyl(chlorophenyl).

4. A compound according to claim 1, wherein $R^2$ is hydrogen.

5. A compound according to claim 1, wherein $R^3$ is alkyl, difluoroalkyl or phenylalkyl.

6. A compound according to claim 5, wherein $R^3$ is butyl, difluorobutyl or phenylmethyl.

7. A compound according to claim 1, wherein $A^1$ is —NH—.

8. A compound according to claim 1, wherein $A^2$ is oxygen.

9. A compound according to claim 1, wherein $A^3$ is —CH—.

10. A compound according to claim 1 selected from the group consisting of:
   2-[[4-chloro-6-(4-methylpiperazin-1-yl)-3-pyridyl]methylamino]-5-propyl-4H-[1,2,4]triazolo[1,5-a]pyrimidin-7-one;
   2-[(4-chloro-6-morpholino-3-pyridyl)methylamino]-5-propyl-4H-[1,2,4]triazolo[1,5-a]pyrimidin-7-one;
   5-butyl-2-[(5-chloro-2-morpholino-pyrimidin-4-yl)methylamino]-4H-[1,2,4]triazolo[1,5-a]pyrimidin-7-one;
   5-butyl-2-[[5-chloro-2-(2-oxa-6-azaspiro[3.3]heptan-6-yl)-4-pyridyl]methylamino]-4H-[1,2,4]triazolo[1,5-a]pyrimidin-7-one;
   5-butyl-2-[(2-chloro-5-pyrimidin-4-yl-phenyl)methylamino]-4H-[1,2,4]triazolo[1,5-a]pyrimidin-7-one;
   2-[[2-chloro-5-(1-methylpyrazol-3-yl)phenyl]methylamino]-5-(2-methoxyethyl)-4H-[1,2,4]triazolo[1,5-a]pyrimidin-7-one;
   2-[(2,4-dichlorophenyl)methylamino]-5-(4,4-difluorobutyl)-4H-[1,2,4]triazolo[1,5-a]pyrimidin-7-one;
   2-[[2-chloro-5-(1-methylpyrazol-3-yl)phenyl]methylamino]-5-(4,4-difluorobutyl)-4H-[1,2,4]triazolo[1,5-a]pyrimidin-7-one;
   5-butyl-2-[(5-cyclopropylisoxazol-3-yl)methylamino]-4H-[1,2,4]triazolo[1,5-a]pyrimidin-7-one;
   2-[[2-chloro-5-(1-methylpyrazol-3-yl)phenyl]methylamino]-5-(3-methoxypropyl)-4H-[1,2,4]triazolo[1,5-a]pyrimidin-7-one;
   5-butyl-2-[(1-phenylpyrazol-3-yl)methylamino]-4H-[1,2,4]triazolo[1,5-a]pyrimidin-7-one;
   5-butyl-2-[(5-phenylisoxazol-3-yl)methylamino]-4H-[1,2,4]triazolo[1,5-a]pyrimidin-7-one;
   5-butyl-2-[(1-pyrazin-2-ylpyrazol-4-yl)methylamino]-4H-[1,2,4]triazolo[1,5-a]pyrimidin-7-one;
   2-[[5-chloro-2-(4-methylpiperazin-1-yl)-4-pyridyl]methylamino]-5-propyl-4H-[1,2,4]triazolo[1,5-a]pyrimidin-7-one;
   5-butyl-2-[(2-methyl-5-phenyl-pyrazol-3-yl)methylamino]-4H-[1,2,4]triazolo[1,5-a]pyrimidin-7-one;
   2-[(2-chloro-5-pyrimidin-2-yl-phenyl)methylamino]-5-propyl-4H-[1,2,4]triazolo[1,5-a]pyrimidin-7-one;
   2-[[5-chloro-2-(1-piperidyl)-4-pyridyl]methylamino]-5-propyl-4H-[1,2,4]triazolo[1,5-a]pyrimidin-7-one;
   2-[[2-chloro-5-(4-methylimidazol-1-yl)phenyl]methylamino]-5-propyl-4H-[1,2,4]triazolo[1,5-a]pyrimidin-7-one;
   2-[[2-chloro-5-(5-methylimidazol-1-yl)phenyl]methylamino]-5-propyl-4H-[1,2,4]triazolo[1,5-a]pyrimidin-7-one;
   2-[(4-morpholinophenyl)methylamino]-5-propyl-4H-[1,2,4]triazolo[1,5-a]pyrimidin-7-one;
   2-[(2-chloro-4-morpholino-phenyl)methylamino]-5-propyl-4H-[1,2,4]triazolo[1,5-a]pyrimidin-7-one;
   2-[(5-chloro-2-morpholino-4-pyridyl)methylamino]-5-propyl-4H-[1,2,4]triazolo[1,5-a]pyrimidin-7-one;
   2-[[5-chloro-2-(3-methoxyazetidin-1-yl)-4-pyridyl]methylamino]-5-propyl-4H-[1,2,4]triazolo[1,5-a]pyrimidin-7-one;
   2-[[2-chloro-5-(1-methylpyrazol-3-yl)phenyl]methylamino]-5-propyl-4H-[1,2,4]triazolo[1,5-a]pyrimidine-7-thione;
   2-[(2-chloro-5-morpholino-phenyl)methylamino]-5-propyl-4H-[1,2,4]triazolo[1,5-a]pyrimidin-7-one;
   2-[(2-chloro-5-pyrimidin-4-yl-phenyl)methylamino]-5-propyl-4H-[1,2,4]triazolo[1,5-a]pyrimidin-7-one;
   2-[(2-chloro-4-phenyl-phenyl)methoxy-5-propyl-4H-[1,2,4]triazolo[1,5-a]pyrimidin-7-one;
   2-[[2-chloro-5-(1-methylpyrazol-4-yl)phenyl]methoxy]-5-propyl-4H-[1,2,4]triazolo[1,5-a]pyrimidin-7-one;
   2-[(2,4-dichlorophenyl)methylamino]-5-ethyl-4H-[1,2,4]triazolo[1,5-a]pyrimidin-7-one;
   2-[(2-chloro-5-pyrimidin-5-yl-phenyl)methylamino]-5-propyl-4H-[1,2,4]triazolo[1,5-a]pyrimidin-7-one;
   5-butyl-2-[(2,4-dichlorophenyl)methylamino]-4H-[1,2,4]triazolo[1,5-a]pyrimidin-7-one;
   2-[[2-chloro-5-(1-methylpyrazol-3-yl)phenyl]methylamino]-5-methyl-4H-[1,2,4]triazolo[1,5-a]pyrimidin-7-one;
   2-[[2-chloro-5-(1-methylpyrazol-3-yl)phenyl]methylamino]-5-ethyl-4H-[1,2,4]triazolo[1,5-a]pyrimidin-7-one;
   5-butyl-2-[[2-chloro-5-(1-methylpyrazol-3-yl)phenyl]methylamino]-4H-[1,2,4]triazolo[1,5-a]pyrimidin-7-one;
   5-benzyl-2-[[2-chloro-5-(4-pyridyl)phenyl]methylamino]-4H-[1,2,4]triazolo[1,5-a]pyrimidin-7-one;
   N-[5-chloro-4-[[(7-oxo-5-propyl-4H-[1,2,4]triazolo[1,5-a]pyrimidin-2-yl)amino]methyl]-2-pyridyl]isoxazole-3-carboxamide;
   2-[[2-chloro-5-(1-methylimidazol-4-yl)phenyl]methylamino]-5-propyl-4H-[1,2,4]triazolo[1,5-a]pyrimidin-7-one;
   4-(1-methylpyrazol-3-yl)-2-[[(7-oxo-5-propyl-4H-[1,2,4]triazolo[1,5-a]pyrimidin-2-yl)amino]methyl]benzonitrile;
   2-[[2-chloro-5-(2-pyridyl)phenyl]methylamino]-5-propyl-4H-[1,2,4]triazolo[1,5-a]pyrimidin-7-one;
   2-[(2-chloro-5-pyridazin-3-yl-phenyl)methylamino]-5-propyl-4H-[1,2,4]triazolo[1,5-a]pyrimidin-7-one;
   2-[1-(4-phenylphenyl)ethylamino]-5-(trifluoromethyl)-4H-[1,2,4]triazolo[1,5-a]pyrimidin-7-one;
   2-[[2-chloro-5-(thiazol-2-ylamino)phenyl]methylamino]-5-propyl-4H-[1,2,4]triazolo[1,5-a]pyrimidin-7-one;
   2-[[2-methoxy-5-(1-methylpyrazol-3-yl)phenyl]methylamino]-5-propyl-4H-[1,2,4]triazolo[1,5-a]pyrimidin-7-one;
   5-benzyl-2-[[2-chloro-5-(1-methylpyrazol-3-yl)phenyl]methylamino]-4H-[1,2,4]triazolo[1,5-a]pyrimidin-7-one;

2-[[2-chloro-5-(1-methylpyrazol-3-yl)phenyl]methyl-amino]-5-(2-phenylethyl)-4H-[1,2,4]triazolo[1,5-a]pyrimidin-7-one;
2-[[2-methyl-5-(1-methylpyrazol-3-yl)phenyl]methyl-amino]-5-propyl-4H-[1,2,4]triazolo[1,5-a]pyrimidin-7-one;
2-[[4-(1-methylpyrazol-3-yl)-2-pyridyl]methylamino]-5-propyl-4H-[1,2,4]triazolo[1,5-a]pyrimidin-7-one;
2-[[5-(1-methylpyrazol-3-yl)-2-(trifluoromethyl)phenyl]methylamino]-5-propyl-4H-[1,2,4]triazolo[1,5-a]pyrimidin-7-one;
2-[[2-chloro-5-(4-pyridyl)phenyl]methylamino]-5-propyl-4H-[1,2,4]triazolo[1,5-a]pyrimidin-7-one;
2-[[2-chloro-5-(1-methylpyrazol-4-yl)phenyl]methyl-amino]-5-propyl-4H-[1,2,4]triazolo[1,5-a]pyrimidin-7-one;
2-[(2-chloro-5-phenyl-phenyl)methylamino]-5-propyl-4H-[1,2,4]triazolo[1,5-a]pyrimidin-7-one;
5-propyl-2-(6-quinolylmethylamino)-4H-[1,2,4]triazolo[1,5-a]pyrimidin-7-one;
2-[[2-chloro-5-(3-pyridyl)phenyl]methylamino]-5-propyl-4H-[1,2,4]triazolo[1,5-a]pyrimidin-7-one;
2-[1-(2,4-dichlorophenyl)ethylamino]-5-(trifluorom-ethyl)-4H-[1,2,4]triazolo[1,5-a]pyrimidin-7-one;
2-[1-(2,4-dichlorophenyl)ethylamino]-5-propyl-4H-[1,2,4]triazolo[1,5-a]pyrimidin-7-one;
2-[[2-fluoro-5-(1-methylpyrazol-3-yl)phenyl]methyl-amino]-5-(trifluoromethyl)-4H-[1,2,4]triazolo[1,5-a]pyrimidin-7-one;
2-[1-(4-phenylphenyl)ethylamino]-5-propyl-4H-[1,2,4]triazolo[1,5-a]pyrimidin-7-one;
2-[[2-chloro-5-(1-methylpyrazol-3-yl)phenyl]methyl-amino]-5-(trifluoromethyl)-4H-[1,2,4]triazolo[1,5-a]pyrimidin-7-one;
2-[[4-(1-methylpyrazol-3-yl)phenyl]methylamino]-5-(trifluoromethyl)-4H-[1,2,4]triazolo[1,5-a]pyrimidin-7-one;
5-(anilinomethyl)-2-[(2,4-dichlorophenyl)methylamino]-4H-[1,2,4]triazolo[1,5-a]pyrimidin-7-one;
2-[(3-phenylphenyl)methylamino]-5-propyl-4H-[1,2,4]triazolo[1,5-a]pyrimidin-7-one;
2-[(4-benzyloxy-2-chloro-phenyl)methylamino]-5-pro-pyl-4H-[1,2,4]triazolo[1,5-a]pyrimidin-7-one;
2-[[4-(1-methylpyrazol-3-yl)phenyl]methylamino]-5-propyl-4H-[1,2,4]triazolo[1,5-a]pyrimidin-7-one;
2-[[3-(1-methylpyrazol-3-yl)phenyl]methylamino]-5-propyl-4H-[1,2,4]triazolo[1,5-a]pyrimidin-7-one;
2-[[2-fluoro-5-(1-methylpyrazol-3-yl)phenyl]methyl-amino]-5-propyl-4H-[1,2,4]triazolo[1,5-a]pyrimidin-7-one;
2-[(2,4-dichlorophenyl)methylamino]-5-(2-phenylethyl)-4H-[1,2,4]triazolo[1,5-a][1,3,5]triazin-7-one;
2-[[2-chloro-5-(1-methylpyrazol-3-yl)phenyl]methyl-amino]-5-propyl-4H-[1,2,4]triazolo[1,5-a]pyrimidin-7-one;
2-[(2-chloro-4-ethoxy-phenyl)methylamino]-5-propyl-4H-[1,2,4]triazolo[1,5-a]pyrimidin-7-one;
2-[[4-(cyclopropoxy)phenyl]methylamino]-5-propyl-4H-[1,2,4]triazolo[1,5-a]pyrimidin-7-one;
2-[(4-imidazol-1-ylphenyl)methylamino]-5-propyl-4H-[1,2,4]triazolo[1,5-a]pyrimidin-7-one;
5-propyl-2-[[4-(2,2,2-trifluoroethoxy)phenyl]methyl-amino]-4H-[1,2,4]triazolo[1,5-a]pyrimidin-7-one;
3-chloro-4-[[(7-oxo-5-propyl-4H-[1,2,4]triazolo[1,5-a]pyrimidin-2-yl)amino]methyl]benzonitrile;
2-[(2-fluoro-4-methoxy-phenyl)methylamino]-5-propyl-4H-[1,2,4]triazolo[1,5-a]pyrimidin-7-one;
5-propyl-2-[(4-pyrazol-1-ylphenyl)methylamino]-4H-[1,2,4]triazolo[1,5-a]pyrimidin-7-one;
2-[(2-fluoro-4-phenyl-phenyl)methylamino]-5-propyl-4H-[1,2,4]triazolo[1,5-a]pyrimidin-7-one;
2-[(2-chloro-4-phenyl-phenyl)methylamino]-5-propyl-4H-[1,2,4]triazolo[1,5-a]pyrimidin-7-one;
2-[(4-phenylphenyl)methylamino]-5-(trifluoromethyl)-4H-[1,2,4]triazolo[1,5-a]pyrimidin-7-one;
5-(cyclobutylmethyl)-2-[(4-phenylphenyl)methylamino]-4H-[1,2,4]triazolo[1,5-a]pyrimidin-7-one;
2-(1,3-benzoxazol-2-ylmethylamino)-5-propyl-4H-[1,2,4]triazolo[1,5-a]pyrimidin-7-one;
5-benzyl-2-[(4-isopropylphenyl)methylamino]-4H-[1,2,4]triazolo[1,5-a]pyrimidin-7-one;
2-[(2,4-dichlorophenyl)methylamino]-5-(2-phenylethyl)-4H-[1,2,4]triazolo[1,5-a]pyrimidin-7-one;
5-benzyl-2-[(2,4-dichlorophenyl)methylamino]-4H-[1,2,4]triazolo[1,5-a]pyrimidin-7-one;
2-[(4-methoxy-2-methyl-phenyl)methylamino]-5-propyl-4H-[1,2,4]triazolo[1,5-a]pyrimidin-7-one;
2-[(2-chloro-4-methoxy-phenyl)methylamino]-5-propyl-4H-[1,2,4]triazolo[1,5-a]pyrimidin-7-one;
5-propyl-2-[(4-pyrimidin-2-ylphenyl)methylamino]-4H-[1,2,4]triazolo[1,5-a]pyrimidin-7-one;
2-[(2,4-dichlorophenyl)methylamino]-5-(2,2,2-trifluoro-ethyl)-4H-[1,2,4]triazolo[1,5-a]pyrimidin-7-one;
2-[(4-phenylphenyl)methylamino]-5-propyl-4H-[1,2,4]triazolo[1,5-a]pyrimidin-7-one;
2-[(4-chloro-2-methyl-phenyl)methylamino]-5-propyl-4H-[1,2,4]triazolo[1,5-a]pyrimidin-7-one;
5-(cyclobutylmethyl)-2-[(2,4-dichlorophenyl)methyl-amino]-4H-[1,2,4]triazolo[1,5-a]pyrimidin-7-one;
2-[(2,4-dichlorophenyl)methylamino]-5-isobutyl-4H-[1,2,4]triazolo[1,5-a]pyrimidin-7-one;
5-(cyclopropylmethyl)-2-[(2,4-dichlorophenyl)methyl-amino]-4H-[1,2,4]triazolo[1,5-a]pyrimidin-7-one;
2-[(4-chloro-2-fluoro-phenyl)methylamino]-5-propyl-4H-[1,2,4]triazolo[1,5-a]pyrimidin-7-one;
2-[(2,4-dichlorophenyl)methylamino]-5-isopropyl-4H-[1,2,4]triazolo[1,5-a]pyrimidin-7-one;
2-[(2,4-dichlorophenyl)methylamino]-5-(trifluorom-ethyl)-4H-[1,2,4]triazolo[1,5-a]pyrimidin-7-one;
5-cyclopropyl-2-[(2,4-dichlorophenyl)methylamino]-4H-[1,2,4]triazolo[1,5-a]pyrimidin-7-one;
2-[(2,4-dichlorophenyl)methylamino]-5-propyl-4H-[1,2,4]triazolo[1,5-a]pyrimidin-7-one;
2-[(4-propan-2-ylphenyl)methylamino]-5-propyl-4H-[1,2,4]triazolo[1,5-a]pyrimidin-7-one; and
2-[(4-ethoxyphenyl)methylamino]-5-propyl-4H-[1,2,4]triazolo[1,5-a]pyrimidin-7-one;
or a pharmaceutically acceptable salt or tautomer thereof.

11. A compound according to any one of claims 1 to 10 selected from:
5-butyl-2-[[5-chloro-2-(2-oxa-6-azaspiro[3.3]heptan-6-yl)-4-pyridyl]methylamino]-4H-[1,2,4]triazolo[1,5-a]pyrimidin-7-one;
5-butyl-2-[(2-chloro-5-pyrimidin-4-yl-phenyl)methyl-amino]-4H-[1,2,4]triazolo[1,5-a]pyrimidin-7-one;
2-[[2-chloro-5-(1-methylpyrazol-3-yl)phenyl]methyl-amino]-5-(4,4-difluorobutyl)-4H-[1,2,4]triazolo[1,5-a]pyrimidin-7-one;
5-butyl-2-[[2-chloro-5-(1-methylpyrazol-3-yl)phenyl]methylamino]-4H-[1,2,4]triazolo[1,5-a]pyrimidin-7-one;
5-benzyl-2-[[2-chloro-5-(4-pyridyl)phenyl]methyl-amino]-4H-[1,2,4]triazolo[1,5-a]pyrimidin-7-one; and 5-benzyl-2-[[2-chloro-5-(1-methylpyrazol-3-yl)phenyl]
methylamino]-4H-[1,2,4]triazolo[1,5-a]pyrimidin-7-
one;

or a pharmaceutically acceptable salt or tautomer thereof.

12. A process for the preparation of a compound according to claim 1, comprising one of the following steps:

(a) reaction of a compound of formula (B1)

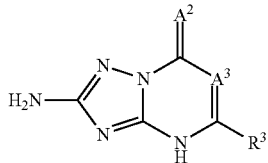

with a compound of formula (B2)

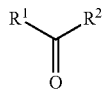

in the presence of a reducing agent and a Lewis acid; or (b) reaction of a compound of formula (C1)

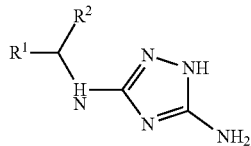

with a compound of formula (C2)

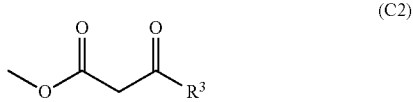

in the presence of an acid.

13. A pharmaceutical composition comprising a compound according to claim 1, or a compound selected from the group consisting of:

2-[(4-benzyloxyphenyl)methylamino]-5-propyl-4H-[1,2,4]triazolo[1,5-a]pyrimidin-7-one;

2-[(4-propan-2-yloxyphenyl)methylamino]-5-propyl-4H-[1,2,4]triazolo[1,5-a]pyrimidin-7-one; and 2-[(2-chlorophenyl)methylamino]-5-[(2-fluoroanilino)methyl]-4H-[1,2,4]triazolo[1,5-a]pyrimidin-7-one;

or a pharmaceutically acceptable salt or tautomer thereof;
and a therapeutically inert carrier.

14. A method for the treatment of systemic lupus erythrematosus (SLE), cutaneous skin diseases like dermatomyositis or cutaneous lupus, interstitial pulmonary fibrosis, Sjogren syndrome, type I diabetes, inflammatory bowel disease, non-alcoholic steatohepatitis (NASH), juvenile inflammatory arthritis, ankylosing spondylitis, gout or Aicardi-Goutieres syndrome (AGS), which method comprises administering to a patient in need thereof an effective amount of a compound of claim 1 or a compound selected from the group consisting of 2-[(4-benzyloxyphenyl)methylamino]-5-propyl-4H-[1,2,4]triazolo [1,5-a]pyrimidin-7-one;

2-[(4-propan-2-yloxyphenyl methylamino]-5-propyl-4H-[1,2,4]triazolo [1,5-a]pyrimidin-7-one; and 2-[(2-chlorophenyl)methylamino]-5-[(2-fluoroanilino)methyl]-4H-[1,2,4]triazolo[1,5-a]pyrimidin-7-one;

or a pharmaceutically acceptable salt or tautomer thereof.

\* \* \* \* \*